( 12 ) United States Patent
Takeguchi et al.

(10) Patent No.: US 8,568,941 B2
(45) Date of Patent: Oct. 29, 2013

(54) FUEL CELL SEPARATOR AND FUEL CELL INCLUDING SAME

(75) Inventors: Shinsuke Takeguchi, Osaka (JP); Takashi Nakagawa, Osaka (JP); Yoichiro Tsuji, Osaka (JP)

(73) Assignee: Panasonic Corporation, Osaka (JP)

( * ) Notice: Subject to any disclaimer, the term of this patent is extended or adjusted under 35 U.S.C. 154(b) by 354 days.

(21) Appl. No.: 12/767,507

(22) Filed: Apr. 26, 2010

(65) Prior Publication Data

US 2010/0227257 A1 Sep. 9, 2010

Related U.S. Application Data

(63) Continuation of application No. PCT/JP2010/001314, filed on Feb. 26, 2010.

(30) Foreign Application Priority Data

Mar. 4, 2009 (JP) .................................. 2009-050063

(51) Int. Cl.
*H01M 8/04* (2006.01)

(52) U.S. Cl.
USPC ............................ 429/514; 429/512; 429/513

(58) Field of Classification Search
None
See application file for complete search history.

(56) References Cited

U.S. PATENT DOCUMENTS

| 6,048,633 A | 4/2000 | Fujii et al. |
| 6,255,011 B1 | 7/2001 | Fujii et al. |
| 6,420,061 B1 | 7/2002 | Fujii et al. |
| 7,067,213 B2 | 6/2006 | Boff et al. |
| 2001/0005557 A1 | 6/2001 | Yosida et al. |
| 2004/0023100 A1* | 2/2004 | Boff et al. ........................ 429/38 |
| 2004/0076869 A1* | 4/2004 | Zhang et al. .................... 429/38 |

(Continued)

FOREIGN PATENT DOCUMENTS

| GB | 2413001 A | 10/2005 |
| JP | 10-284094 | 10/1998 |

(Continued)

OTHER PUBLICATIONS

International Search Report issued in International Application No. PCT/JP2010/001314 filed Feb. 26, 2010.

(Continued)

*Primary Examiner* — Barbara Gilliam
*Assistant Examiner* — Adam A Arciero
(74) *Attorney, Agent, or Firm* — McDermott Will & Emery LLP

(57) ABSTRACT

A separator for use in a fuel cell of the present disclosure includes: a plate; a first gas manifold hole (51) for supplying a reactant gas, formed to penetrate said plate in a thickness direction thereof; a second gas manifold hole (52) for discharging the reactant gas, formed to penetrate said plate in a thickness direction thereof; one or more groove-like first main gas channels (18) formed on a surface of said plate to have one end connected to said first gas manifold hole (51) and the other end connected to said second gas manifold hole; a groove-like first sub-gas channel (28) formed on the surface of said plate to have one end connected to at least one of said first gas manifold hole (51) and said second gas manifold hole (52); and a groove-like second sub-gas channel (38) formed on the surface of said plate to have one end branching from said first sub-gas channel (28) and the other end being closed.

13 Claims, 18 Drawing Sheets

(56) References Cited

U.S. PATENT DOCUMENTS

| | | |
|---|---|---|
| 2004/0151971 A1* | 8/2004 | Rock ............................. 429/38 |
| 2004/0157103 A1 | 8/2004 | Takeguchi et al. |
| 2005/0019647 A1 | 1/2005 | Blank et al. |
| 2005/0271909 A1 | 12/2005 | Bai et al. |
| 2007/0105000 A1 | 5/2007 | Chapman et al. |
| 2010/0104923 A1 | 4/2010 | Takeguchi et al. |

FOREIGN PATENT DOCUMENTS

| | | |
|---|---|---|
| JP | 11-016591 | 1/1999 |
| JP | 2000-294261 | 10/2000 |
| JP | 2003-311696 | 11/2000 |
| JP | 2001-185172 | 7/2001 |
| JP | 2003-282099 | 10/2003 |
| JP | 2004-134277 | 4/2004 |
| JP | 2004-146230 A | 5/2004 |
| JP | 2004-158369 | 6/2004 |
| JP | 2004-520692 | 7/2004 |
| JP | 2004-247289 | 9/2004 |
| JP | 2004-356100 | 12/2004 |
| JP | 2005-158513 | 6/2005 |
| JP | 2005-190714 | 7/2005 |
| JP | 2006-004702 | 1/2006 |
| JP | 2006-236750 | 9/2006 |
| JP | 2006-527906 | 12/2006 |
| JP | 2007-265824 | 10/2007 |
| JP | 2007-335255 | 12/2007 |
| WO | WO-03/041199 A2 | 5/2003 |
| WO | WO 2009/084183 A1 | 7/2009 |
| WO | WO 2009/141989 A1 | 11/2009 |
| WO | WO 2009/141990 A1 | 11/2009 |

OTHER PUBLICATIONS

Extended European Search Report issued in European Patent Application No. 10748473.5 mailed on Jan. 28, 2013.

English translation of Chinese Office Action issued in Chinese Patent Application No. 201080010443.9 mailed on Jul. 31, 2013.

* cited by examiner

FUEL CELL SEPARATOR AND FUEL CELL INCLUDING SAME

CROSS-REFERENCE TO RELATED APPLICATIONS

This is a continuation of PCT International Application PCT/JP2010/001314 filed on Feb. 26, 2010, which claims priority to Japanese Patent Application No. 2009-050063 filed on Mar. 4, 2009, the disclosures of which applications are hereby incorporated by reference herein.

BACKGROUND OF THE INVENTION

1. Field of the Invention

The present disclosure relates to a fuel cell separator and a fuel cell including the fuel cell separator, and particularly to the configuration of the fuel cell separator.

2. Description of the Related Art

A polymer electrolyte fuel cell (hereinafter referred to as "PEFC") causes a hydrogen-containing fuel gas and an oxygen-containing oxidizing gas, such as air, to electrochemically react with each other to generate electric power and heat at the same time. A single cell (cell) of the PEFC includes an MEA (Membrane-Electrode Assembly), gaskets, and electrically-conductive plate-shaped separators. The MEA includes a polymer electrolyte membrane and a pair of gas diffusion electrodes (an anode and a cathode). Generally, the PEFC is configured such that a plurality of cells are stacked on one another, end plates sandwich the stacked cells from both sides of the stacked cells, and the end plates and the cells are fastened by fastening members.

In a case where the polymer electrolyte membrane contains moisture so as to be saturated, a specific resistance thereof lowers, and the polymer electrolyte membrane serves as an electrolyte having hydrogen ion conductivity. Therefore, during an electric power generating operation, reactant gases (the fuel gas and the oxidizing gas) are humidified and then supplied to the PEFC. Moreover, during the electric power generating operation of the PEFC, water is generated as a reaction product in the cathode by the oxidation of the hydrogen. The water in the humidified reactant gas and the water as the reaction product contribute to the realization of the saturation of the moisture content of the polymer electrolyte membrane. The surplus water is discharged to outside of the PEFC together with the surplus anode and cathode gases.

The performance of the PEFC is greatly influenced by appropriate management of the steam and the produced water used for humidifying the reactant gases. In a case where the produced water or condensed water stays at a specific region, the reactant gas cannot be supplied to the electrode corresponding to the region, and this causes deterioration of a cell performance (so-called flooding). Moreover, in a case where a humidification amount (steam content) of the reactant gas to be supplied to the PEFC is small (in a case where the PEFC is operated under a so-called low humidification condition), the deterioration of the cell performance occurs by the reduction in the moisture content of the polymer electrolyte membrane in the vicinity of a portion of the gas diffusion electrode to which portion the reactant gas is supplied at first (this is called dry up).

To solve such problems, the shapes of the gas channels are devised to discharge the surplus moisture in the cell to outside. Or, the water is moved to a portion of the same cell in which portion the water is scarce. Thus, approaches to solve the problems, such as the flooding and the dry up has been performed (see Document 1 (Japanese Laid-Open Patent Application Publication No. 2005-158513) and Document 2 (Japanese Laid-Open Patent Application Publication No. 2006-236750) for example).

In the fuel cell disclosed in Document 1, a fine groove extending along an upstream side to downstream side of a reactant gas channel is formed at a rib portion of the separator which portion contacts the MEA. This intends to remove the produced water and the condensed water by guiding the water to the fine groove, and move the water at the downstream side where the water tends to be excessive to the upstream side where the water tends to be scarce.

Moreover, in the fuel cell separator disclosed in Document 2, a water reservoir groove is formed to extend in parallel with the gas channel. This intends to move the water at the downstream side to a locally dry region of the upstream side.

However, the present inventors have found that even in the fuel cell disclosed in Document 1 and the fuel cell separator disclosed in Document 2, there is still room for improvement in light of the improvement of the cell performance when the electric power generation is carried out using the reactant gases which are low in humidity. To be specific, in the fuel cell disclosed in Document 1 and the fuel cell separator disclosed in Document 2, in a case where the fuel cell generates the electric power under such an operating condition that the downstream region is surely saturated, the surplus water existing as the water may be able to be moved to the upstream side through the fine groove or the water reservoir groove. However, if the downstream region is not saturated even in consideration of the produced water and the gas consumption, the moisture is not moved through these grooves to the upstream, so that the cell performance cannot be adequately improved.

Moreover, in a case where the number of fine grooves is one as in the case of the fuel cell disclosed in Document 1, and the fine groove is clogged by the accumulation of the produced water, the reactant gas cannot flow through a portion of the fine groove which portion is located on the downstream side of the clogged portion, since there is no place to which the produced water is evacuated. Therefore, in the fuel cell disclosed in Document 1, the reactant gas cannot be adequately supplied to the gas diffusion electrode facing this portion, so that the cell performance cannot be adequately improved.

Moreover, in the fuel cell separator disclosed in Document 2, since a water reservoir groove is not communicated with a reactant gas supplying manifold hole and a reactant gas discharging manifold hole, the reactant gas is not directly supplied to the water reservoir groove. Therefore, the reactant gas cannot be adequately supplied to the gas diffusion electrode facing the water reservoir groove, so that the cell performance cannot be adequately improved.

The present disclosure was made to solve the above problems, and an object of the present disclosure is to provide a fuel cell separator capable of producing a high-humidity high-gas-concentration electrode region especially in a case where the PEFC is operated under the low humidification condition and adequately improving the cell performance, and a fuel cell including the fuel cell separator.

SUMMARY OF THE INVENTION

As a result of diligent study to solve the above problems of the related art, the present inventors have found the followings.

In the fuel cell separator disclosed in Document 1, an electric power generating reaction occurs by a very small amount of reactant gas supplied to the fine groove, and the produced water is generated. Then, the present inventors have found that since the amount of reactant gas flowing through the fine groove is small, a discharging property of the produced water is bad, and the relative humidity of the reactant gas in the fine groove becomes higher than the relative humidity of the reactant gas in the reactant gas channel. To be specific, the present inventors have found that by forming as a part of the reactant gas channel a sub-gas channel whose supply amount is smaller than that of the reactant gas channel, the gas channel relatively high in humidity can be secured within a cell plane. The present inventors have found that this is more effective for the cell performance in a case where the reactant gas to be supplied is especially in the low humidification condition.

The present inventors have found that adopting the below-described configuration is highly effective in achieving the object of the present disclosure. Thus, the present disclosure has been achieved.

To be specific, a fuel cell separator according to the present disclosure includes: a plate; a first gas manifold hole for supplying a reactant gas, formed to penetrate said plate in a thickness direction thereof; a second gas manifold hole for discharging the reactant gas, formed to penetrate said plate in a thickness direction thereof; one or more groove-like first main gas channels formed on a surface of said plate to have one end connected to said first gas manifold hole and the other end connected to said second gas manifold hole; a groove-like first sub-gas channel formed on the surface of said plate to have one end connected to at least one of said first gas manifold hole and said second gas manifold hole; and a groove-like second sub-gas channel formed on the surface of said plate to have one end branching from said first sub-gas channel and the other end being closed.

In a case where both ends of the first sub-gas channel of the fuel cell separator according to the present disclosure are respectively connected to the first gas manifold hole and the second gas manifold hole, the reactant gas supplied from the first gas manifold hole flows through the first main gas channel and the first sub-gas channel to be discharged to the second gas manifold hole. Therefore, the water generated by the electrochemical reaction of the reactant gases in the first main gas channel and the first sub-gas channel is discharged through the second gas manifold hole.

Moreover, the reactant gas is supplied from the first sub-gas channel or the first main gas channel to the second sub-gas channel by the underground flow having passed through the gas diffusion layer. As a result, in a portion of the gas diffusion electrode (hereinafter simply referred to as "electrode") which portion faces the second sub-gas channel and in the vicinity of the portion, the electric power generating reaction is carried out, and the water is generated.

Since the second sub-gas channel branches from the first sub-gas channel and has one end (downstream end) being closed, the reactant gas does not forcibly flow through the second sub-gas channel. Therefore, the water generated in the second sub-gas channel can remain in the second sub-gas channel, and the relative humidity in the second sub-gas channel increases. Moreover, since the relative humidity in the second sub-gas channel increases, the relative humidity in the portion of the electrode which portion faces the second sub-gas channel and in the vicinity of the portion can also be increased. Therefore, in a case where the reactant gas is low in humidity, the humidity and the gas supply which significantly influence the cell performance can be secured not only in a portion of the electrode which portion faces the first main gas channel and the first sub-gas channel and in the vicinity of the portion but also in the portion of the electrode which portion faces the second sub-gas channel and in the vicinity of the portion. Therefore, the cell performance can be increased by using the fuel cell separator according to the present disclosure in the fuel cell.

Even in a case where the first sub-gas channel has one end connected to the first gas manifold hole or the second gas manifold hole and the other end being closed, the reactant gas can be directly supplied from the first sub-gas channel to the second sub-gas channel. Moreover, even if the produced water remains in a portion of the first sub-gas channel, the produced water can be evacuated by the reactant gas to the second sub-gas channel. Therefore, the clogging of the first sub-gas channel by the produced water can be suppressed. On this account, in a case where the reactant gas is low in humidity, the humidity and the gas supply which significantly influence the cell performance can be secured not only in the portion of the electrode which portion faces the first main gas channel and the first sub-gas channel and in the vicinity of the portion but also in the portion of the electrode which portion faces the second sub-gas channel and in the vicinity of the portion. Thus, the cell performance can be improved by using the fuel cell separator according to the present disclosure in the fuel cell.

Herein, the above configuration in which the other end of the second sub-gas channel is closed denotes that the other end of the second sub-gas channel is not communicated with the other channel. For example, it denotes that a rib is formed between the other end of the second sub-gas channel and the first main gas channel.

Moreover, in the fuel cell separator according to the present disclosure, the first main gas channel may be formed to be bent.

Moreover, in the fuel cell separator according to the present disclosure, the first main gas channel may be formed to have a serpentine shape.

Moreover, in the fuel cell separator according to the present disclosure, the second sub-gas channel may be provided at a first rib formed to be sandwiched by the first main gas channel.

With this, the second sub-gas channel is formed adjacent to the first main gas channel, and the reactant gas is supplied from the first sub-gas channel or the main gas channel formed adjacent to the second sub-gas channel to the second sub-gas channel by the underground flow having passed through the gas diffusion layer. As a result, the reactant gas is adequately supplied to the second sub-gas channel, and in a case where the reactant gas is low in humidity, the humidity and the gas supply which significantly influence the cell performance can be adequately secured in the portion of the electrode which portion faces the second sub-gas channel and in the vicinity of the portion. Therefore, the cell performance can be improved.

Moreover, in the fuel cell separator according to the present disclosure, a cross-sectional area of the first sub-gas channel may be smaller than a cross-sectional area of the first main gas channel.

With this, since the flow rate of the reactant gas supplied to the first sub-gas channel can be reduced as compared to the flow rate of the reactant gas supplied to the first main gas channel, the moisture remaining in the second sub-gas channel is unlikely to be discharged to outside of the cell, so that the relative humidity in the second sub-gas channel can be further increased. Moreover, the reactant gas which significantly contributes to the electric power generating reaction is not the reactant gas supplied to the first sub-gas channel but the reactant gas supplied to the first main gas channel. Therefore, by increasing the amount of gas supplied to the first main gas channel, the reactant gas supplied to the fuel cell can be efficiently utilized for the electric power generating reaction.

Moreover, in the fuel cell separator according to the present disclosure, the first sub-gas channel may have one end connected to the first gas manifold hole and the other end connected to the second gas manifold hole.

Moreover, in the fuel cell separator according to the present disclosure, the first sub-gas channel may have one end connected to the first gas manifold hole and the other end being closed.

Moreover, in the fuel cell separator according to the present disclosure, the first sub-gas channel may have one end being closed and the other end connected to the second gas manifold hole.

Moreover, in the fuel cell separator according to the present disclosure, a plurality of the first main gas channels may be formed to extend in parallel with one another, and a groove-like third sub-gas channel may be provided at a second rib formed between the plurality of the first main gas channels.

Moreover, in the fuel cell separator according to the present disclosure, the third sub-gas channel may have one end connected to the first gas manifold hole or the second gas manifold hole and the other end being closed.

Further, in the fuel cell separator according to the present disclosure, the second sub-gas channel may be one of a plurality of second sub-gas channels.

Moreover, a fuel cell according to the present disclosure includes: a first separator including: a plate; a first gas manifold hole for supplying a reactant gas, formed to penetrate said plate in a thickness direction thereof; a second gas manifold hole for discharging the reactant gas, formed to penetrate said plate in a thickness direction thereof; one or more groove-like first main gas channels formed on a surface of said plate to have one end connected to said first gas manifold hole and the other end connected to said second gas manifold hole; a groove-like first sub-gas channel formed on the surface of said plate to have one end connected to at least one of said first gas manifold hole and said second gas manifold hole; and a groove-like second sub-gas channel formed on the surface of said plate to have one end branching from said first sub-gas channel and the other end being closed; a second separator including a plate; and a membrane-electrode assembly provided between the first separator and the second separator.

In a case where both ends of the first sub-gas channel of the first separator are respectively connected to the first gas manifold hole and the second gas manifold hole, the reactant gas supplied from the first gas manifold hole flows through the first main gas channel and the first sub-gas channel to be discharged to the second gas manifold hole. Therefore, the water generated by the electrochemical reaction of the reactant gases in the first main gas channel and the first sub-gas channel is discharged through the second gas manifold hole.

Moreover, the reactant gas is supplied from the first sub-gas channel or the first main gas channel to the second sub-gas channel by the underground flow having passed through the gas diffusion layer. As a result, in a portion of the gas diffusion electrode (hereinafter simply referred to as "electrode") which portion faces the second sub-gas channel and in the vicinity of the portion, the electric power generating reaction is carried out, and the water is generated.

Since the second sub-gas channel branches from the first sub-gas channel and has one end (downstream end) being closed, the reactant gas does not forcibly flow through the second sub-gas channel. Therefore, the water generated in the second sub-gas channel can remain in the second sub-gas channel, and the relative humidity in the second sub-gas channel increases. Moreover, since the relative humidity in the second sub-gas channel increases, the relative humidity in the portion of the electrode which portion faces the second sub-gas channel and in the vicinity of the portion can also be increased. Therefore, in the fuel cell according to the present disclosure, in a case where the reactant gas is low in humidity, the humidity and the gas supply which significantly influence the cell performance can be secured not only in a portion of the electrode which portion faces the first main gas channel and the first sub-gas channel and in the vicinity of the portion but also in the portion of the electrode which portion faces the second sub-gas channel and in the vicinity of the portion. Therefore, the cell performance can be increased by using the fuel cell according to the present disclosure.

Even in a case where the first sub-gas channel has one end connected to the first gas manifold hole or the second gas manifold hole and the other end being closed, the reactant gas can be directly supplied from the first sub-gas channel to the second sub-gas channel. Moreover, even if the produced water remains in a portion of the first sub-gas channel, the produced water can be evacuated by the reactant gas to the second sub-gas channel. Therefore, the clogging of the first sub-gas channel by the produced water can be suppressed. On this account, in the fuel cell according to the present disclosure, in a case where the reactant gas is low in humidity, the humidity and the gas supply which significantly influence the cell performance can be secured not only in the portion of the electrode which portion faces the first main gas channel and the first sub-gas channel and in the vicinity of the portion but also in the portion of the electrode which portion faces the second sub-gas channel and in the vicinity of the portion. Thus, the cell performance can be improved.

Further, in the fuel cell according to the present disclosure, a groove-like second main gas channel may be formed on one main surface of the second separator, and at least a part of the second main gas channel may overlap the second sub-gas channel of the first separator when viewed from the thickness direction of the first separator.

With this, the water remaining in the second sub-gas channel can be supplied through the polymer electrolyte membrane to the second main gas channel of the second separator which is low in water content and to the electrode facing the second main gas channel of the second separator. Thus, the cell performance can be improved by the improvement of the relative humidity of both electrodes.

Moreover, in the fuel cell according to the present disclosure, the second main gas channel may be formed to be bent.

Further, in the fuel cell according to the present disclosure, the second main gas channel may be formed to have a serpentine shape.

The above object, other objects, features, and advantages of the present disclosure will be made clear by the following detailed explanation of preferred embodiments with reference to the attached drawings.

In accordance with the fuel cell separator and the fuel cell of the present disclosure, even if the reactant gas to be supplied is low in humidity, a high-humidity high-gas-concentration electrode region can be produced, so that the cell performance can be improved.

DESCRIPTION OF THE PREFERRED EMBODIMENTS

Figure 1:
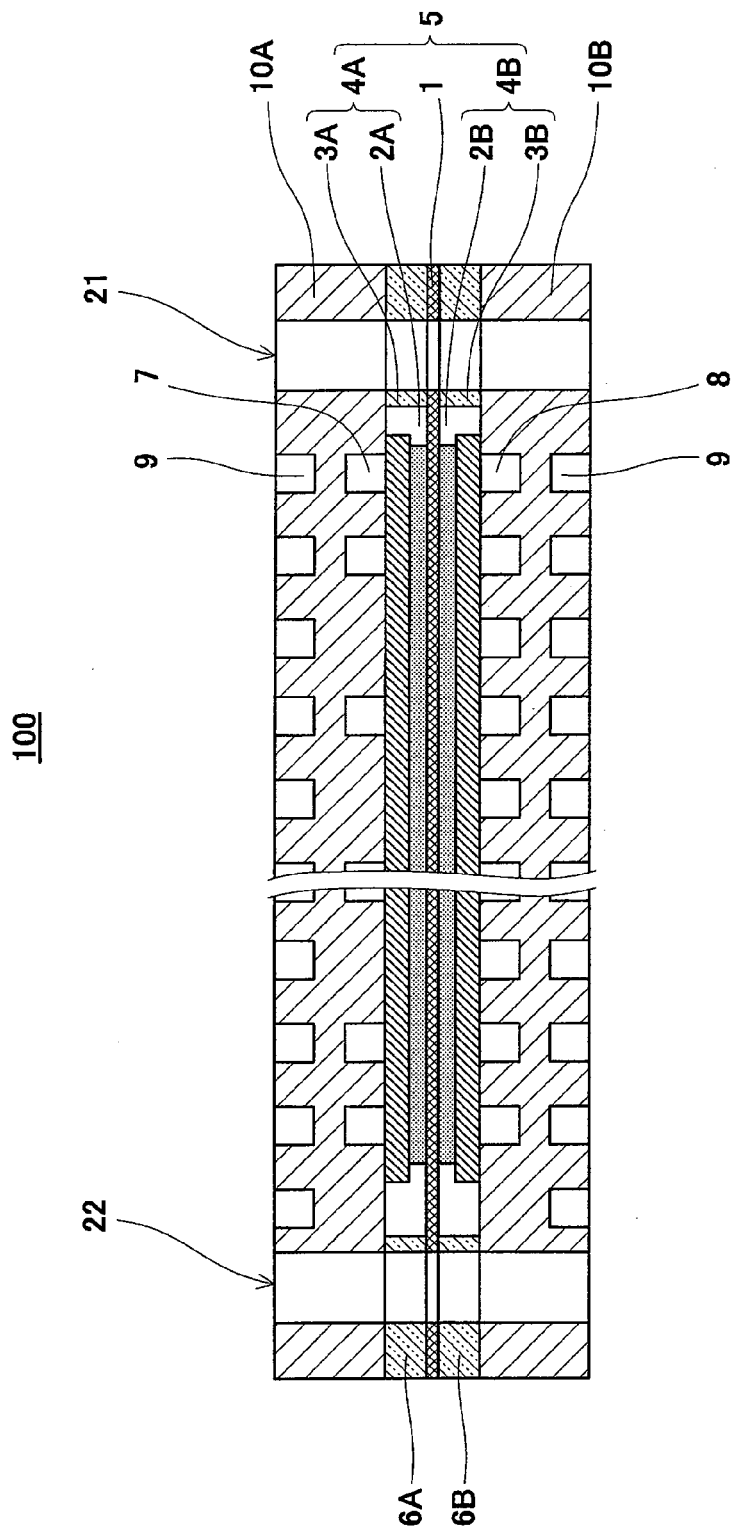
FIG. 1 is a cross-sectional view schematically showing a schematic configuration of a fuel cell according to Embodiment 1 of the present disclosure.

Hereinafter, preferred embodiments of the present disclosure will be explained in reference to the drawings. In the drawings, the same reference numbers are used for the same or corresponding portions, and a repetition of the same explanation may be avoided. In FIGS. 2 to 10, a vertical direction of a separator is shown as a vertical direction of the drawing. Moreover, in the drawings, only components necessary for explaining the present disclosure are shown, and the other components are omitted. Further, the present disclosure is not limited to Embodiments below.

Embodiment 1

Configuration of Fuel Cell

FIG. 1 is a cross-sectional view schematically showing a schematic configuration of a fuel cell according to Embodiment 1 of the present disclosure. In FIG. 1, a part of the fuel cell is omitted.

As shown in FIG. 1, a fuel cell 100 according to Embodiment 1 is a single cell (cell) and includes an MEA (Membrane-Electrode Assembly; polymer electrolyte layer-electrode assembly) 5, gaskets 6A and 6B, an anode separator 10A, and a cathode separator 10B.

The MEA 5 includes a polymer electrolyte membrane (polymer electrolyte layer; for example, Nafion (Product Name) produced by Du Pont in the U.S.) 1 which selectively transports hydrogen ions, an anode 4A, and a cathode 4B.

The polymer electrolyte membrane 1 has a substantially quadrangular shape (herein, rectangular shape). The anode 4A and the cathode 4B (which are gas diffusion electrodes) are respectively disposed on both surfaces of the polymer electrolyte membrane 1 such that each of the anode 4A and the cathode 4B is located on not a peripheral portion of the surface thereof but an inner region of the surface thereof. Below-described manifold holes, such as an oxidizing gas supplying manifold hole 51, are formed at the peripheral portion of the polymer electrolyte membrane 1 so as to penetrate the polymer electrolyte membrane 1 in a thickness direction thereof.

The anode 4A includes an anode catalyst layer 2A and an anode gas diffusion layer 3A. The anode catalyst layer 2A is disposed on one of main surfaces of the polymer electrolyte membrane 1 and formed by a mixture of electrically-conductive carbon particles supporting electrode catalysts (for example, precious metal, such as platinum) and polymer electrolyte having hydrogen ion conductivity. The anode gas diffusion layer 3A is disposed on a main surface of the anode catalyst layer 2A and has both gas permeability and electrical conductivity. Similarly, the cathode 4B includes a cathode catalyst layer 2B and a cathode gas diffusion layer 3B. The cathode catalyst layer 2B is disposed on the other main surface of the polymer electrolyte membrane 1 and formed by the mixture of the electrically-conductive carbon particles supporting the electrode catalysts (for example, precious metal, such as platinum) and the polymer electrolyte having the hydrogen ion conductivity. The cathode gas diffusion layer 3B is disposed on a main surface of the cathode catalyst layer 2B and has both the gas permeability and the electrical conductivity.

Each of the anode catalyst layer 2A and the cathode catalyst layer 2B can be formed by a method known in the art using a catalyst layer forming ink containing electrically-conductive carbon particles supporting electrode catalysts made of precious metal, polymer electrolyte, and dispersion medium. Moreover, a material constituting the anode gas diffusion layer 3A and the cathode gas diffusion layer 3B is not especially limited, and a material known in the art can be used. For example, an electrically-conductive porous base material, such as carbon cloth or carbon paper, can be used. Moreover, the electrically-conductive porous base material may be subjected to water repellent finish by a known method. For example, an electrically-conductive porous sheet containing as major components electrically-conductive carbon particles and polymeric resin can be used.

Moreover, a pair of annular and substantially rectangular gaskets 6A and 6B made of fluorocarbon rubber are respectively disposed around the anode 4A and the cathode 4B of the MEA 5 so as to sandwich the polymer electrolyte membrane 1. This prevents the leakage of the fuel gas, the air, or the oxidizing gas to outside of the cell and the mixing of these gases in the fuel cell 100. Below-described manifold holes, such as the oxidizing gas supplying manifold hole 51, are formed at a peripheral portion of each of the gaskets 6A and 6B so as to penetrate each of the gaskets 6A and 6B in a thickness direction thereof.

Moreover, an electrically-conductive plate-shaped anode separator (second separator) 10A and an electrically-conductive plate-shaped cathode separator (fuel cell separator; first separator) 10B are disposed to sandwich the MEA 5 and the gaskets 6A and 6B. With this, the MEA 5 is mechanically fixed. Moreover, in a case where a plurality of fuel cells 100 are stacked on one another in the thickness direction, the MEAs 5 are electrically connected to one another. As the separators 10A and 10B, a material, such as a metal, graphite, or a mixture of graphite and resin, having excellent thermal conductivity and electrical conductivity can be used. For example, a separator manufactured by injection molding using a mixture of carbon powder and binder (solvent) or a separator manufactured by plating the surface of a titanium plate or a stainless steel plate with gold can be used.

A groove-like fuel gas channel 7 through which the fuel gas flows is formed on one main surface (hereinafter referred to as "inner surface") of the anode separator 10A which surface contacts the anode 4A, and a groove-like cooling medium channel 9 through which cooling medium flows is formed on the other main surface (hereinafter referred to as "outer surface") of the anode separator 10A. Similarly, a groove-like oxidizing gas channel 8 through which the oxidizing gas flows is formed on one main surface (hereinafter referred to as "inner surface") of the cathode separator 10B which surface contacts the cathode 4B, and a groove-like cooling medium channel 9 through which the cooling medium flows is formed on the other main surface (hereinafter referred to as "outer surface") of the cathode separator 10B.

With this, the fuel gas is supplied to the anode 4A, the oxidizing gas is supplied to the cathode 4B, and these gases react with each other to generate electricity and heat. Moreover, the generated heat is recovered by causing the cooling medium, such as cooling water or ethylene glycol, to flow through the cooling medium channels 9.

The fuel cell 100 configured as above may be used as the single cell (cell), or a plurality of fuel cells 100 may be stacked on one another to be used as a cell stack. Moreover, in the case of stacking the fuel cells 100, one cooling medium channel 9 may be formed for every two or three single cells. Further, in a case where the cooling medium channel 9 is not formed between the single cells, a separator having one main surface on which the fuel gas channel 7 is formed and the other main surface on which the oxidizing gas channel 8 is formed, i.e., a separator serving as both the anode separator 10A and the cathode separator 10B may be used as a separator sandwiched between two MEAs 5.

Next, the cathode separator 10B and the anode separator 10A will be explained in detail in reference to FIGS. 1 to 3.

Configuration of Separator

Figure 2:
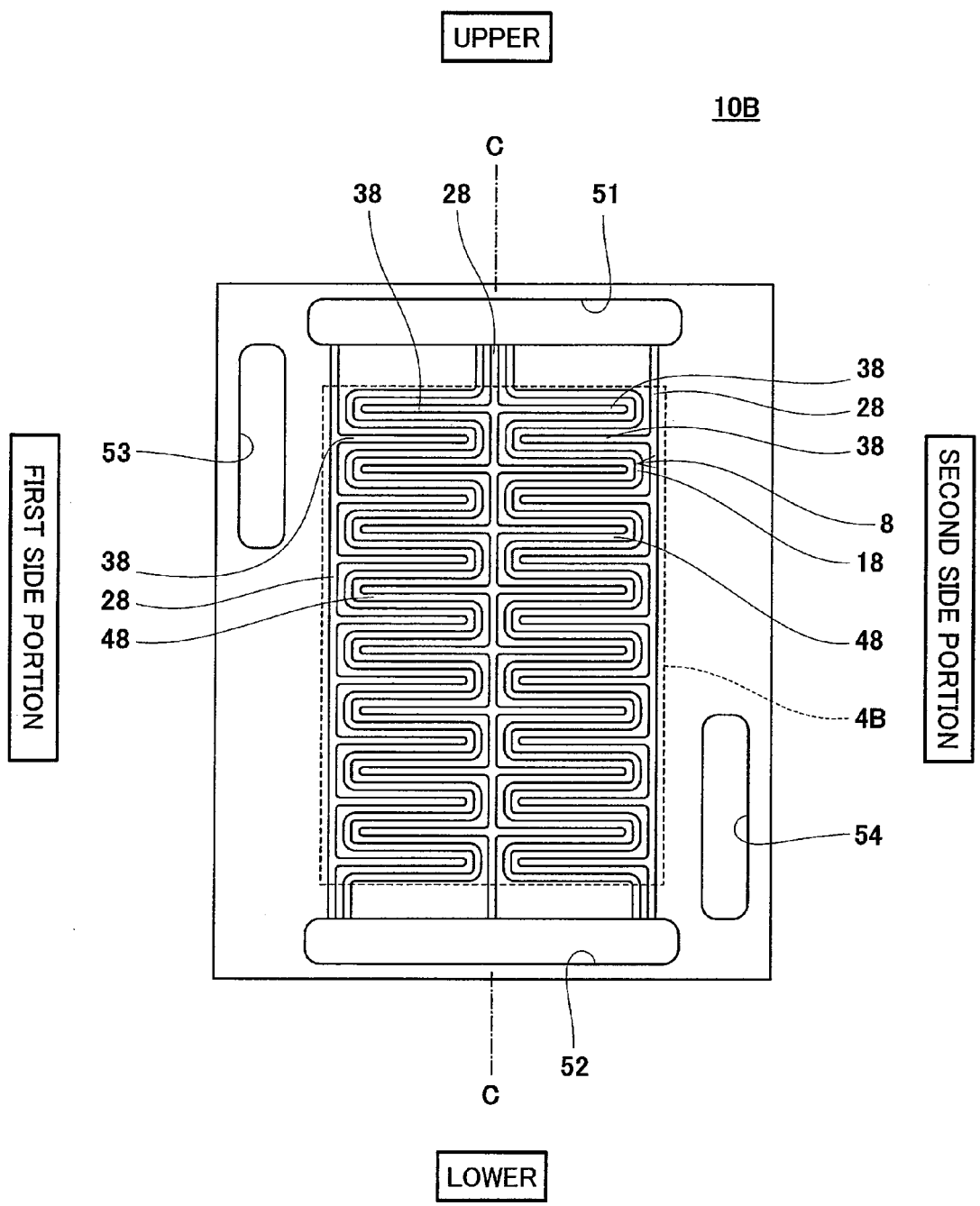
FIG. 2 is a schematic diagram showing a schematic configuration of a cathode separator of the fuel cell shown in FIG. 1.

FIG. 2 is a schematic diagram showing a schematic configuration of the cathode separator 10B of the fuel cell 100 shown in FIG. 1.

As shown in FIG. 2, the cathode separator 10B that is the fuel cell separator according to Embodiment 1 is configured to be plate-shaped and substantially rectangular. A plurality of through holes are formed at a peripheral portion of the main surface of the cathode separator 10B so as to penetrate the cathode separator 10B in the thickness direction, and these through holes form the manifold holes, such as the oxidizing gas supplying manifold hole 51. Specifically, the oxidizing gas supplying manifold hole (first gas manifold hole) 51 is formed at an upper portion of the cathode separator 10B, and an oxidizing gas discharging manifold hole (second gas manifold hole) 52 is formed at a lower portion of the cathode separator 10B. A fuel gas supplying manifold hole 53 is formed at an upper portion of one side portion (portion on a left side in the drawing; hereinafter referred to as "first side portion") of the cathode separator 10B, and a fuel gas discharging manifold hole 54 is formed at a lower portion of the other side portion (portion on a right side in the drawing; hereinafter referred to as "second side portion") of the cathode separator 10B. A cooling medium supplying manifold hole through which the cooling medium is supplied and a cooling medium discharging manifold hole through which the cooling medium is discharged are omitted.

The oxidizing gas channel 8 is formed on the inner surface of the cathode separator 10B so as to cause the oxidizing gas supplying manifold hole 51 and the oxidizing gas discharging manifold hole 52 to be communicated with each other. The oxidizing gas channel 8 is constituted by a plurality of grooves 18, 28, and 38. These grooves are a first main gas channel 18, a first sub-gas channel 28, and a second sub-gas channel 38. A portion between the grooves constituting the oxidizing gas channel 8 forms a rib contacting the cathode 4B. A rib formed only by the first main gas channel 18 (rib formed to be sandwiched by the first main gas channel 18) is referred to as a first rib 48. In Embodiment 1, the oxidizing gas channel 8 is formed symmetrically with respect to a central axis C of the cathode separator 10B.

Herein, the first main gas channel 18 is constituted by two grooves. An upstream end of each groove is connected to the oxidizing gas supplying manifold hole 51, and a downstream end thereof is connected to the oxidizing gas discharging manifold hole 52. The first main gas channel 18 is formed to have a serpentine shape such that the oxidizing gas is supplied to the entire region (region shown by a broken line in FIG. 2) of the main surface of the cathode 4B.

Herein, the first sub-gas channel 28 is constituted by three grooves. An upstream end of each groove is connected to the oxidizing gas supplying manifold hole 51, and a downstream end thereof is connected to the oxidizing gas discharging manifold hole 52. Moreover, the grooves of the first sub-gas channel 28 are formed to respectively extend along both side portions of the cathode 4B and the central axis C.

The second sub-gas channel 38 is formed to branch from the first sub-gas channel 28. An upstream end of the second sub-gas channel 38 is connected to the first sub-gas channel 28, and a downstream end thereof is closed. The second sub-gas channel 38 is provided at the first rib 48 and formed to be sandwiched by a portion of the first main gas channel 18 which portion extends in a horizontal direction (direction from the first side portion to the second side portion).

Herein, the above sentence "the downstream end of the second sub-gas channel 38 is closed" denotes that the downstream end of the second sub-gas channel 38 is not communicated with the other channel. For example, in Embodiment 1, the second sub-gas channel 38 is provided at the first rib 48, and a rib is formed between the downstream end of the second sub-gas channel 38 and the first main gas channel 18.

The cooling medium channel 9 is formed on the outer surface of the cathode separator 10B so as to cause the cooling medium supplying manifold hole (not shown) and the cooling medium discharging manifold hole (not shown) to be communicated with each other. The cooling medium channel 9 may be formed such that the cooling medium is supplied to the entire region of the outer surface of the cathode separator 10B. For example, the cooling medium channel 9 may be formed to have a serpentine shape.

Next, the anode separator 10A will be explained in detail in reference to FIGS. 1 and 3. FIG. 3 is a schematic diagram showing a schematic configuration of the anode separator 10A of the fuel cell 100 shown in FIG. 1.

Figure 3:
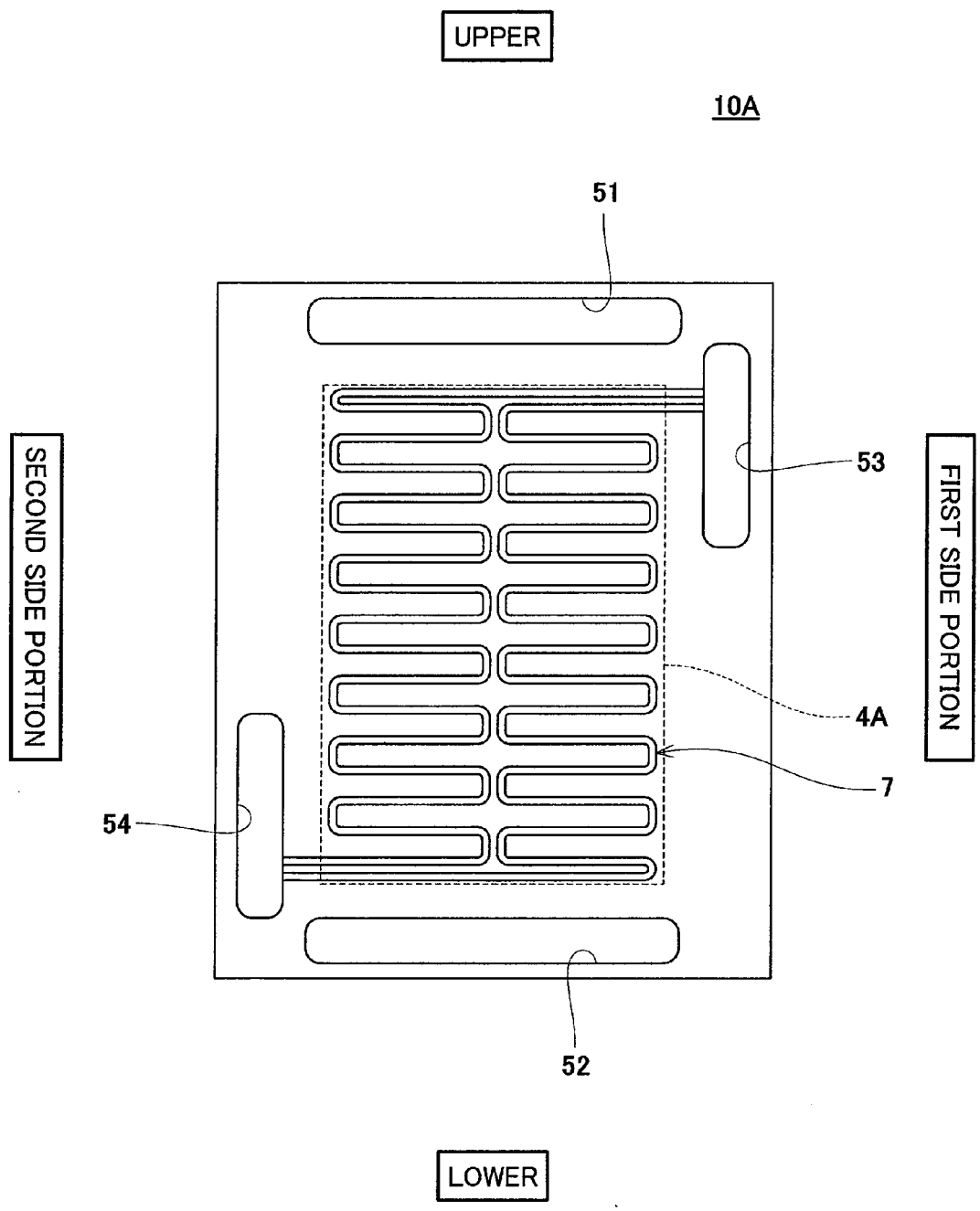
FIG. 3 is a schematic diagram showing a schematic configuration of an anode separator of the fuel cell shown in FIG. 1.

As shown in FIG. 3, the anode separator 10A is configured to be plate-shaped and substantially rectangular. As with the cathode separator 10B, the manifold holes, such as the oxidizing gas supplying manifold hole 51, are formed at a peripheral portion of the main surface of the anode separator 10A.

The fuel gas channel 7 that is a second main gas channel is formed on the inner surface of the anode separator 10A so as to cause the fuel gas supplying manifold hole 53 and the fuel gas discharging manifold hole 54 to be communicated with each other. Herein, the fuel gas channel 7 is constituted by two grooves and formed to have a serpentine shape such that the fuel gas is supplied to the entire region (region shown by a broken line in FIG. 3) of the main surface of the anode 4A. Moreover, a part of the fuel gas channel 7 (herein, a horizontally extending portion of the fuel gas channel 7) is formed to overlap the second sub-gas channel 38 of the oxidizing gas channel 8 when viewed from the thickness direction of the anode separator 10A (cathode separator 10B) (see FIG. 1). As with the cathode separator 10B, the cooling medium channel 9 is formed on the outer surface of the anode separator 10A.

Next, operational advantages of the fuel cell separator 10B according to Embodiment 1 and the fuel cell 100 including the fuel cell separator 10B will be explained in reference to FIGS. 1 to 3.

Operational Advantages of Fuel Cell Separator and Fuel Cell Including Same

As described above, the first main gas channel 18 is formed on the cathode separator 10B that is the fuel cell separator according to Embodiment 1 so as to face the entire region of the main surface of the cathode 4B, and the oxidizing gas can be adequately supplied to the entire cathode 4B.

Moreover, in a portion of the cathode 4B which portion faces the second sub-gas channel 38 and in the vicinity of the portion (hereinafter referred to as "region of the cathode 4B which region faces the second sub-gas channel 38"), the oxidizing gas supplied from the first sub-gas channel 28 or the first main gas channel 18 formed adjacent to the second sub-gas channel 38 by an underground flow having passed through the cathode gas diffusion layer 3B electrochemically reacts to generate water. Since the downstream end of the second sub-gas channel 38 is closed, the oxidizing gas does not forcibly flow through the second sub-gas channel 38. Therefore, the generated water is not forcibly discharged to outside of the fuel cell 100 by the flow of the oxidizing gas and remains in a region of the cathode 4B which region faces the second sub-gas channel 38 and in the second sub-gas channel 38. With this, especially in a case where the fuel cell 100 is operated under so-called low humidification condition (condition in which the moisture is adjusted such that the dew point of the reactant gas becomes lower than the operating temperature of the fuel cell), each of the relative humidity in the region of the cathode 4B which region faces the second sub-gas channel 38 and the relative humidity in the second sub-gas channel 38 increases by the remaining moisture.

Therefore, in the fuel cell separator 10B according to Embodiment 1 and the fuel cell 100 including the fuel cell separator 10B, in a case where the reactant gas is low in humidity, the humidity and the gas supply which significantly influence the cell performance can be secured in the region of the cathode 4B which region faces the second sub-gas channel 38, so that the cell performance can be improved.

To be specific, in the cathode separator 10B that is the fuel cell separator according to Embodiment 1 and the fuel cell 100 including the cathode separator 10B, especially in a case where the fuel cell 100 is operated under the low humidification condition, the first main gas channel 18 configured to mainly supply the oxidizing gas to the entire region of the cathode 4B, the first sub-gas channel 28 configured to supply the oxidizing gas to the second sub-gas channel 38, and the second sub-gas channel 38 configured to branch from the first sub-gas channel 28 and cause the water generated by the electrochemical reaction to remain therein are formed on the cathode separator 10B, and the first main gas channel 18 and the second sub-gas channel 38 are formed adjacent to each other. With this, a high-humidity high-gas-concentration region is formed in the fuel cell 100. Thus, the cell performance can be improved.

Moreover, in the fuel cell 100 according to Embodiment 1, a part of the fuel gas channel 7 of the anode separator 10A (herein, a horizontally extending portion of the fuel gas channel 7) is formed to overlap the second sub-gas channel 38 of the oxidizing gas channel 8 when viewed from the thickness direction of the anode separator 10A (cathode separator 10B). Therefore, even if a region of the anode 4A which region faces the fuel gas channel 7 becomes a low humidification state, the moisture in the high-humidity region of the cathode 4B which region faces the second sub-gas channel 38 and the moisture in the second sub-gas channel 38 move through the polymer electrolyte membrane 1 of the MEA 5 to the anode 4A by concentration diffusion. With this, the humidity in the fuel gas channel 7 and the humidity in the anode 4A can be appropriately maintained, and the drying of the polymer electrolyte membrane 1 can be suppressed. Therefore, in the fuel cell 100 according to Embodiment 1, the cell performance can be improved.

In Embodiment 1, the horizontally extending portion of the fuel gas channel 7 of the anode separator 10A is formed to overlap the second sub-gas channel 38 of the oxidizing gas channel 8 when viewed from the thickness direction of the anode separator 10A (cathode separator 10B). However, the present embodiment is not limited to this. To obtain the above operational advantages, a part of the fuel gas channel 7 may be formed to overlap a part of the second sub-gas channel 38.

Embodiment 2

Figure 4:
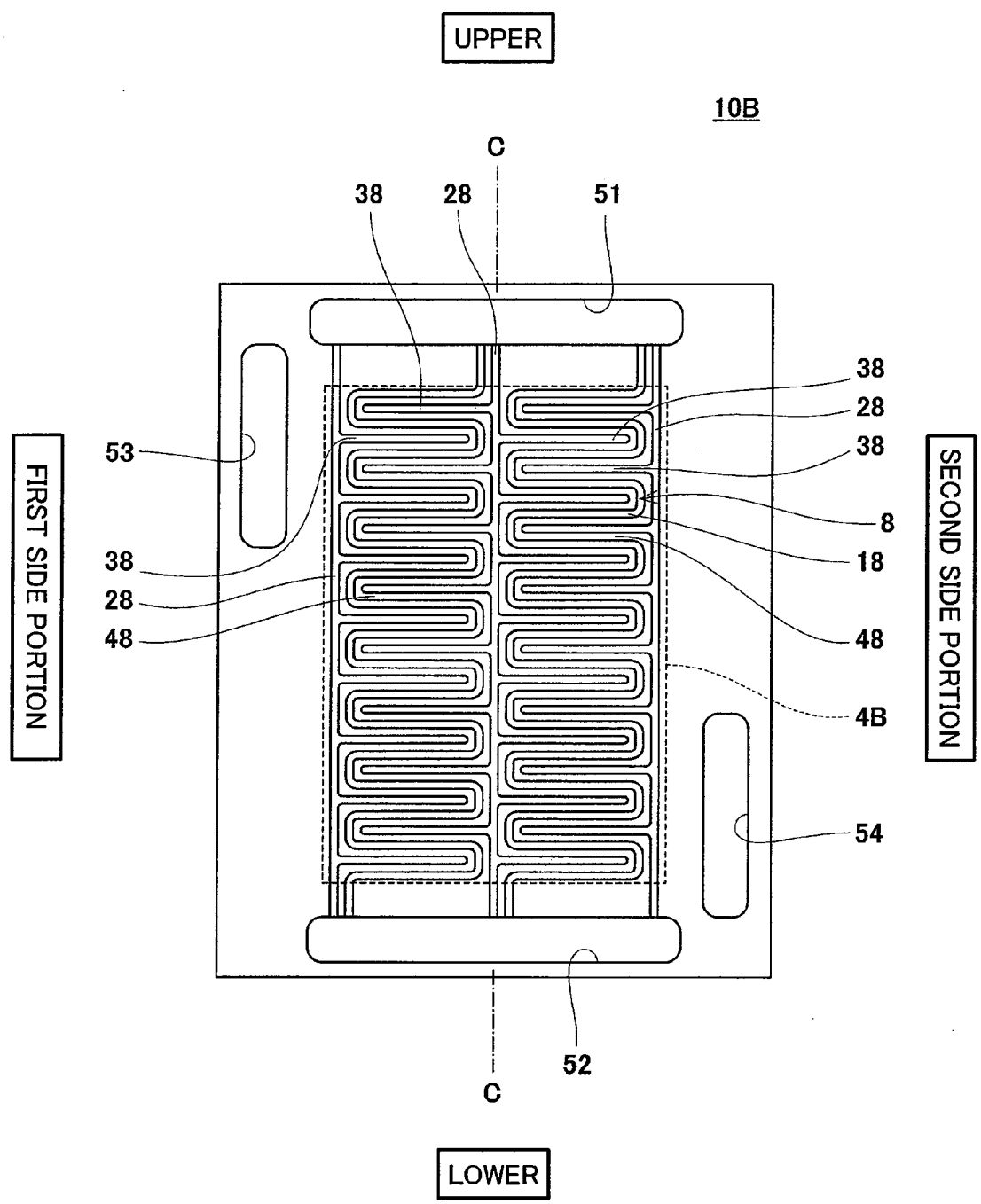
FIG. 4 is a schematic diagram showing a schematic configuration of a fuel cell separator according to Embodiment 2 of the present disclosure.

FIG. 4 is a schematic diagram of a schematic configuration of the fuel cell separator according to Embodiment 2 of the present disclosure.

As shown in FIG. 4, the fuel cell separator (cathode separator) 10B according to Embodiment 2 is the same in basic configuration as the fuel cell separator (cathode separator) 10B according to Embodiment 1. In Embodiment 2, the oxidizing gas channel 8 is not formed symmetrically with respect to the central axis C and is different in shape from that of Embodiment 1. Specifically, the first main gas channel 18 formed on the first side portion side of the central axis C is formed in the same manner as that of the cathode separator 10B of the fuel cell 100 according to Embodiment 1. In contrast, the first main gas channel 18 formed on the second side portion side of the central axis C is formed to have the same shape as the first main gas channel 18 formed on the first side portion side. To be specific, two first main gas channels 18 are formed to extend in parallel with each other with the central axis C sandwiched therebetween (are formed in parallel with each other).

Even the fuel cell separator 10B according to Embodiment 2 configured as above and the fuel cell 100 including the fuel cell separator 10B have the same operational advantages as the fuel cell separator 10B according to Embodiment 1 and the fuel cell 100 including the fuel cell separator 10B.

Embodiment 3

Figure 5:
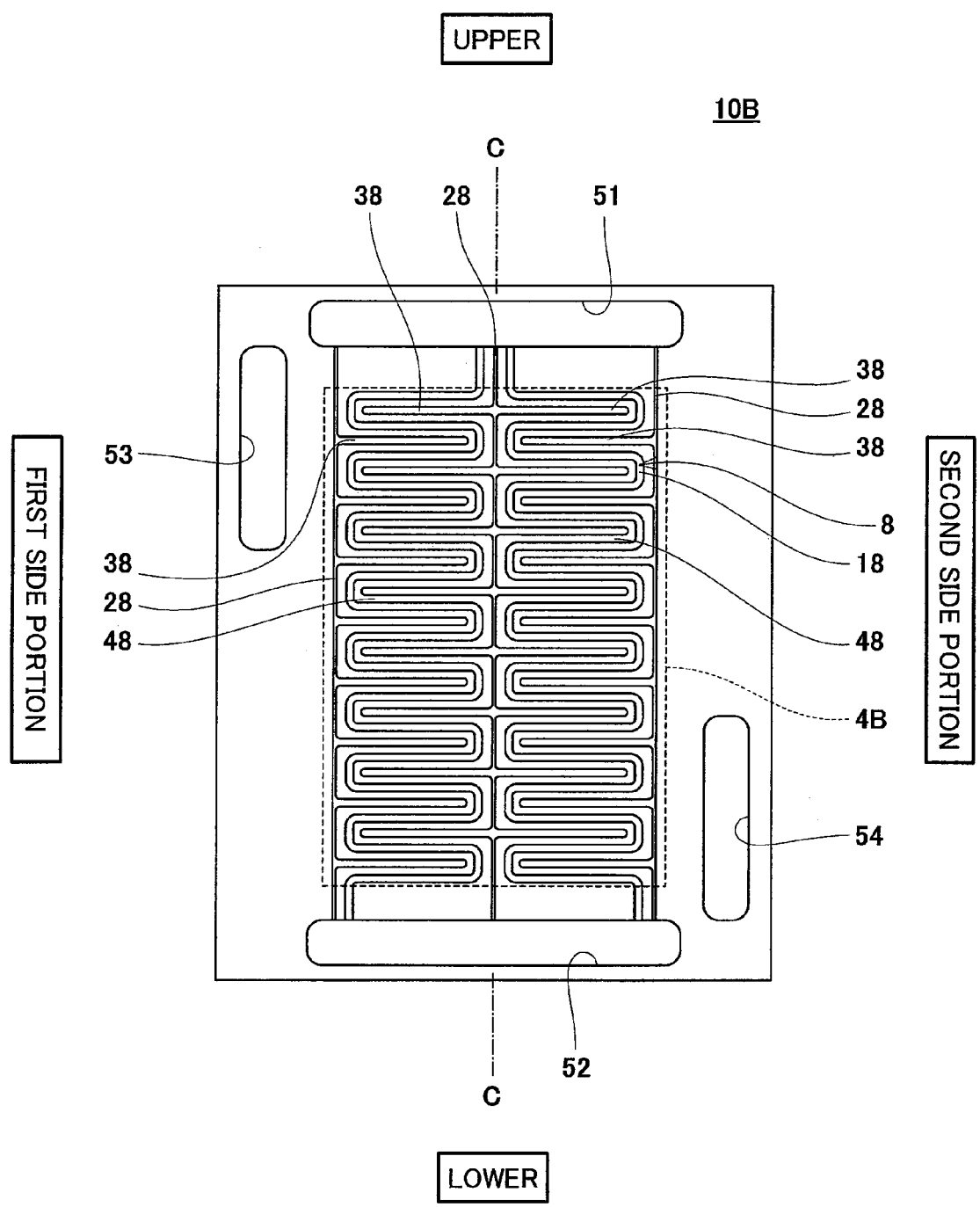
FIG. 5 is a schematic diagram showing a schematic configuration of the fuel cell separator according to Embodiment 3 of the present disclosure.

FIG. 5 is a schematic diagram showing a schematic configuration of the fuel cell separator according to Embodiment 3 of the present disclosure.

As shown in FIG. 5, the fuel cell separator (cathode separator) 10B according to Embodiment 3 of the present disclosure is the same in basic configuration as the fuel cell separator (cathode separator) 10B according to Embodiment 1. However, Embodiment 3 is different from Embodiment 1 in that an area of a cross section of the groove constituting the first sub-gas channel 28 which section is vertical to the flow of the oxidizing gas (hereinafter simply referred to as "cross-sectional area") is smaller than each of the cross-sectional area of the first main gas channel 18 and the cross-sectional area of the second sub-gas channel 38. Specifically, in Embodiment 3, the width of the first sub-gas channel 28 is smaller than each of the width of the first main gas channel 18 and the width of the second sub-gas channel 38.

The fuel cell separator 10B according to Embodiment 3 configured as above and the fuel cell 100 including the fuel cell separator 10B have the same operational advantages as the fuel cell 100 according to Embodiment 1.

The first main gas channel 18 having a serpentine shape is longer than the first sub-gas channel 28 having a linear shape. Therefore, if the cross-sectional area of the first main gas channel 18 and the cross-sectional area of the first sub-gas channel 28 are the same as each other, the pressure loss of the first sub-gas channel 28 becomes lower than that of the first main gas channel 18, and the flow rate of the oxidizing gas flowing through the first sub-gas channel 28 becomes higher than that of the oxidizing gas flowing through the first main gas channel 18.

However, in the fuel cell separator 10B according to Embodiment 3 and the fuel cell 100 including the fuel cell separator 10B, the cross-sectional area of the first sub-gas channel 28 is set to be smaller than that of the first main gas channel 18, so that the flow rate of the oxidizing gas flowing through the first main gas channel 18 can be increased. Therefore, in the fuel cell separator 10B according to Embodiment 3 and the fuel cell 100 including the fuel cell separator 10B, a larger amount of oxidizing gas can be supplied to the cathode 4B, so that the cell performance can be further improved.

In Embodiment 3, to reduce the cross-sectional area of the first sub-gas channel 28, the width of the first sub-gas channel 28 is set to be smaller than each of the width of the first main gas channel 18 and the width of the second sub-gas channel 38. However, the present embodiment is not limited to this. For example, the depth of the first sub-gas channel 28 may be set to be shallower than each of the depth of the first main gas channel 18 and the depth of the second sub-gas channel 38. Moreover, for example, the cross-sectional area of the second sub-gas channel 38 may be reduced in addition to the first sub-gas channel 28, or the cross-sectional area of only the second sub-gas channel 38 may be reduced.

Embodiment 4

Figure 6:
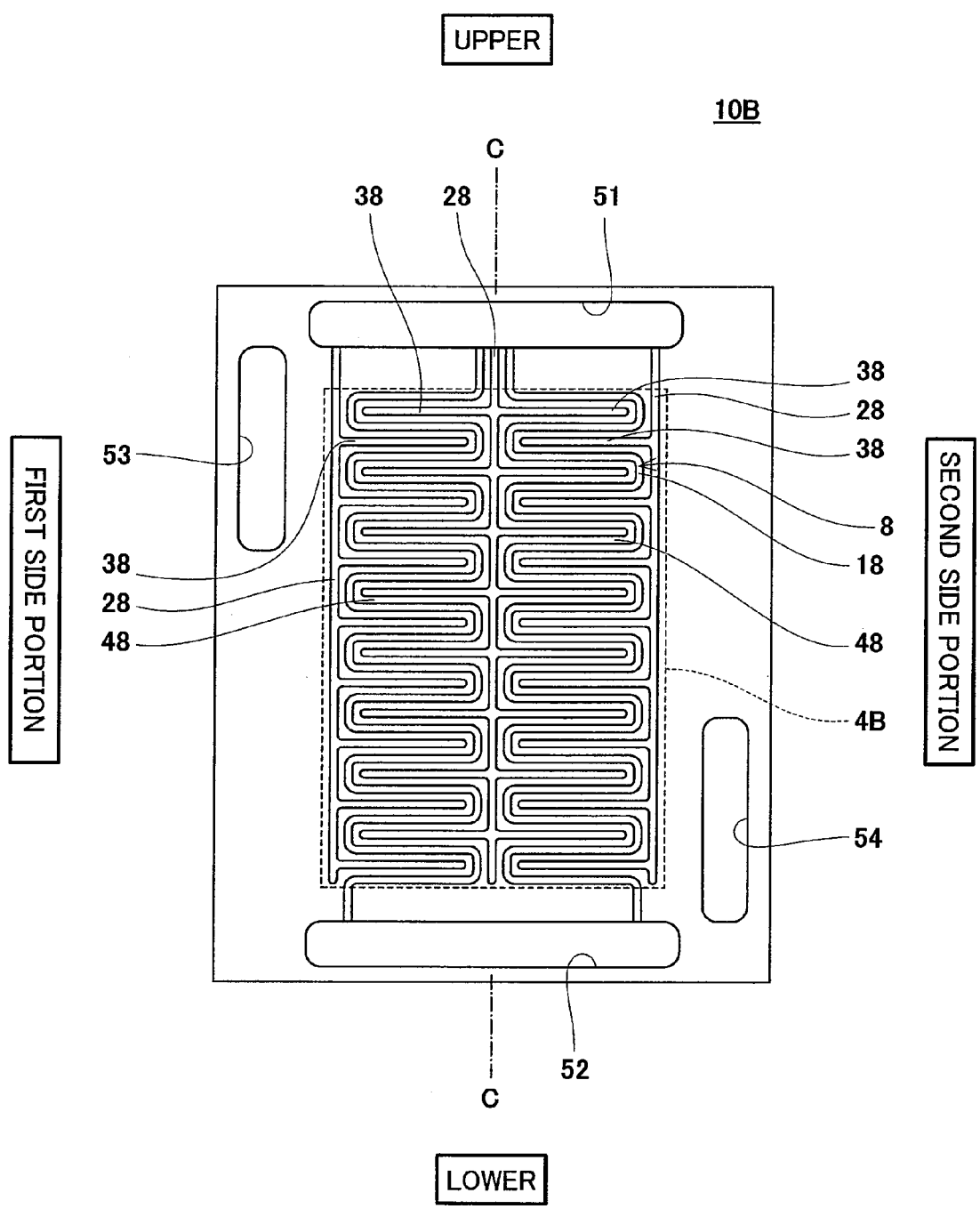
FIG. 6 is a schematic diagram showing a schematic configuration of the fuel cell separator according to Embodiment 4 of the present disclosure.

FIG. 6 is a schematic diagram showing a schematic configuration of the fuel cell separator according to Embodiment 4 of the present disclosure.

As shown in FIG. 6, the fuel cell separator (cathode separator) 10B according to Embodiment 4 of the present disclosure is the same in basic configuration as the fuel cell separator (cathode separator) 10B according to Embodiment 1. However, Embodiment 4 is different from Embodiment 1 in that the first sub-gas channel 28 and the oxidizing gas discharging manifold hole 52 are not communicated with each other, i.e., the downstream end of the first sub-gas channel 28 is closed.

In the fuel cell separator 10B according to Embodiment 4 configured as above and the fuel cell 100 including the fuel cell separator 10B, since the first sub-gas channel 28 and the oxidizing gas discharging manifold hole 52 are not communicated with each other, the oxidizing gas is not forcibly supplied to the first sub-gas channel 28. However, since the first sub-gas channel 28 is communicated with the oxidizing gas supplying manifold hole 51, a slight amount of oxidizing gas is supplied to the first sub-gas channel 28. Therefore, in a case where the oxidizing gas is consumed in the second sub-gas channel 38, the oxidizing gas can be supplied from the first sub-gas channel 28.

Moreover, even in a case where the produced water remains in the first sub-gas channel 28, the produced water can be moved to the second sub-gas channel 38 by the pressure of the oxidizing gas. Therefore, the clogging of the first sub-gas channel 28 by the produced water remaining in the first sub-gas channel 28 can be suppressed.

Therefore, even the fuel cell separator 10B according to Embodiment 4 and the fuel cell 100 including the fuel cell separator 10B have the same operational advantages as the fuel cell separator 10B according to Embodiment 1 and the fuel cell 100 including the fuel cell separator 10B.

In the configuration of the reactant gas channels of the fuel cell separator according to the present disclosure, a ratio between the reactant gas distributed to the first main gas channel 18 and the reactant gas distributed to the first sub-gas channel 28 is important for the improvement of the cell performance. However, setting the above ratio while taking the cross-sectional shapes, the lengths, and the like of the channels into consideration in advance is extremely difficult.

However, by closing the downstream end of the first sub-gas channel 28 as in the fuel cell separator 10B according to Embodiment 4, the first main gas channel 18 actively supply the reactant gas (herein, the oxidizing gas) to the gas diffusion electrode, and it becomes unnecessary to design the gas distribution to the first main gas channel 18 and the first sub-gas channel 28. Therefore, in the fuel cell separator 10B according to Embodiment 4 and the fuel cell 100 including the fuel cell separator 10B, design limitations regarding the shapes, the cross-sectional shapes, the lengths, and the like of the gas channels are reduced.

Embodiment 5

Figure 7:
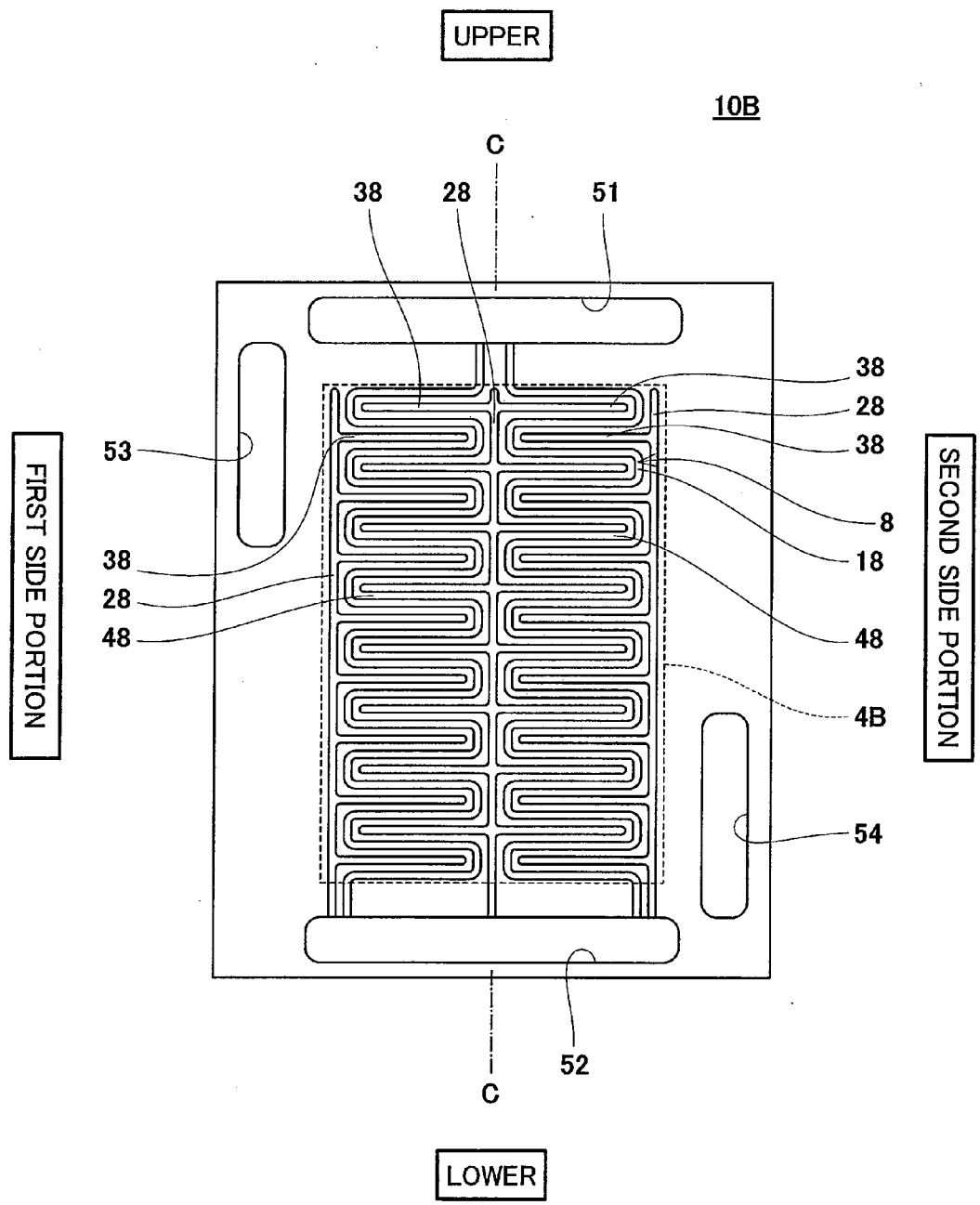
FIG. 7 is a schematic diagram showing a schematic configuration of the fuel cell separator according to Embodiment 5 of the present disclosure.

FIG. 7 is a schematic diagram showing a schematic configuration of the fuel cell separator according to Embodiment 5 of the present disclosure.

As shown in FIG. 7, the fuel cell separator (cathode separator) 10B according to Embodiment 5 of the present disclosure is the same in basic configuration as the fuel cell separator (cathode separator) 10B according to Embodiment 4. However, Embodiment 5 is different from Embodiment 4 in that the first sub-gas channel 28 and the oxidizing gas supplying manifold hole 51 are not communicated with each other, i.e., unlike the fuel cell separator 10B according to Embodiment 4, the upstream end of the first sub-gas channel 28 is closed.

In the fuel cell separator 10B according to Embodiment 5 configured as above and the fuel cell 100 including the fuel cell separator 10B, since the first sub-gas channel 28 is communicated with the oxidizing gas discharging manifold hole 52 and is not communicated with the oxidizing gas supplying manifold hole 51, the oxidizing gas is supplied through the oxidizing gas discharging manifold hole 52 to the first sub-gas channel 28. Therefore, even the fuel cell separator 10B according to Embodiment 5 and the fuel cell 100 including the fuel cell separator 10B have the same operational advantages as the fuel cell separator 10B according to Embodiment 4 and the fuel cell 100 including the fuel cell separator 10B.

Embodiment 6

Figure 8:
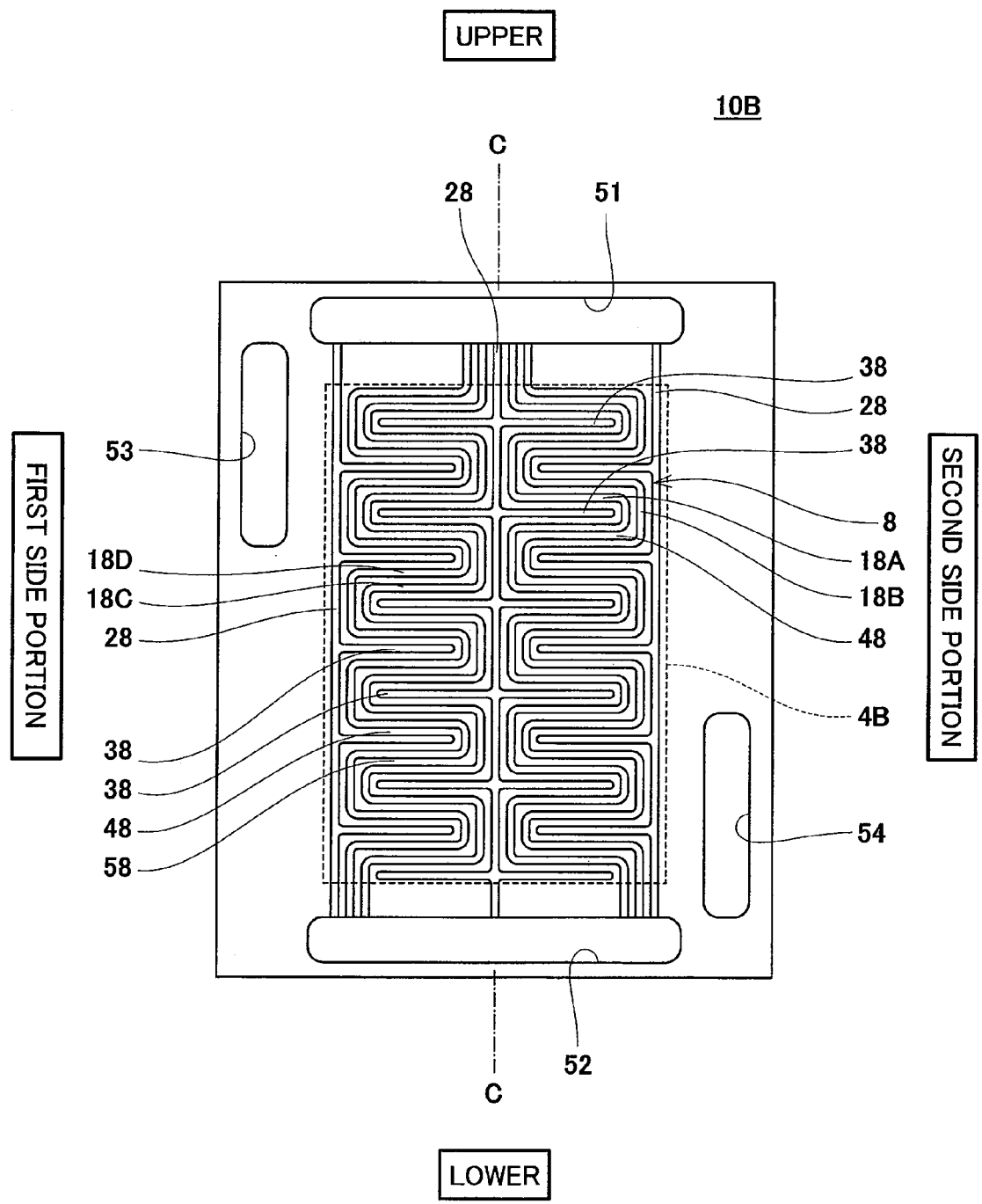
FIG. 8 is a schematic diagram showing a schematic configuration of the fuel cell separator according to Embodiment 6 of the present disclosure.

FIG. 8 is a schematic diagram showing a schematic configuration of the fuel cell separator according to Embodiment 6 of the present disclosure.

As shown in FIG. 8, the fuel cell separator (cathode separator) 10B according to Embodiment 6 of the present disclosure is the same in basic configuration as the fuel cell separator 10B according to Embodiment 1. However, Embodiment 6 is different from Embodiment 1 in that four grooves 18A to 18D are first main gas channels 18A to 18D, the first main gas channel 18A and the first main gas channel 18B are formed to extend in parallel with each other, and the first main gas channel 18C and the first main gas channel 18D are formed to extend in parallel with each other. A second rib 58 is formed between the first main gas channel 18A and the first main gas channel 18B, and the second rib 58 is formed between the first main gas channel 18C and the first main gas channel 18D.

Even the fuel cell separator 10B according to Embodiment 6 configured as above and the fuel cell 100 including the fuel cell separator 10B have the same operational advantages as the fuel cell separator 10B according to Embodiment 1 and the fuel cell 100 including the fuel cell separator 10B.

Embodiment 7

Figure 9:
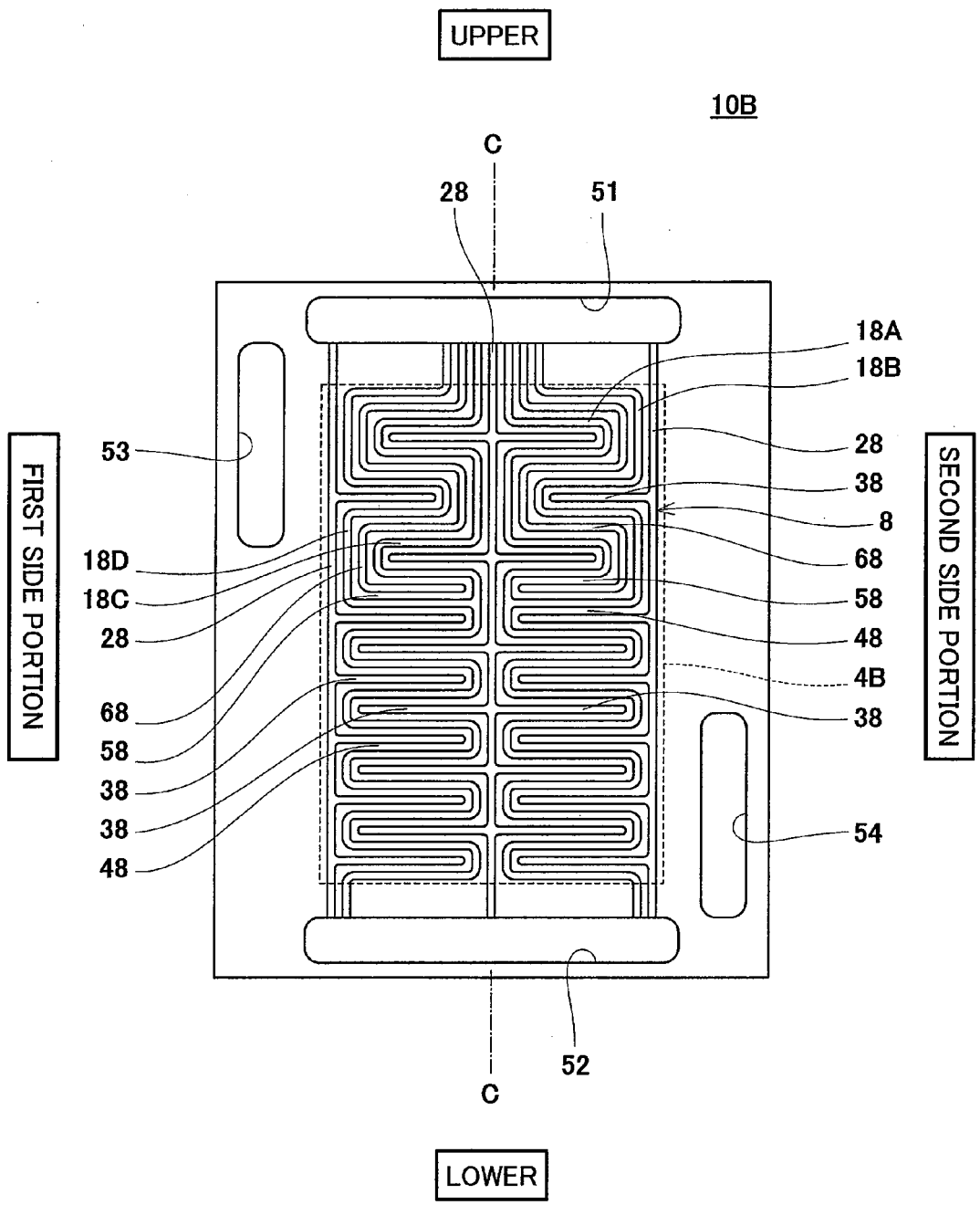
FIG. 9 is a schematic diagram showing a schematic configuration of the fuel cell separator according to Embodiment 7 of the present disclosure.

FIG. 9 is a schematic diagram showing a schematic configuration of the fuel cell separator according to Embodiment 7 of the present disclosure.

As shown in FIG. 9, the fuel cell separator (cathode separator) 10B according to Embodiment 7 of the present disclosure is the same in basic configuration as the fuel cell separator (cathode separator) 10B according to Embodiment 6. However, Embodiment 7 is different from Embodiment 6 in that: each of a downstream end of the first main gas channel 18B and a downstream end of the first main gas channel 18D is not communicated with the oxidizing gas discharging manifold hole 52; the downstream end of the first main gas channel 18B is connected to a portion of the first main gas channel 18A; the downstream end of the first main gas channel 18D is connected to a portion of the first main gas channel 18C; and a third sub-gas channel 68 is provided at the second rib 58.

Herein, the third sub-gas channel 68 is constituted by two grooves. An upstream end of each groove is communicated with the oxidizing gas supplying manifold hole 51, and a downstream end thereof is closed. Moreover, the third sub-gas channel 68 is formed to extend in parallel with the first main gas channel 18A and the first main gas channel 18B or extend in parallel with the first main gas channel 18C and the first main gas channel 18D.

Herein, the above sentence "the downstream end of the third sub-gas channel 68 is closed" denotes that the downstream end of the third sub-gas channel 68 is not communicated with the other channel. For example, in Embodiment 7, the third sub-gas channel 68 is provided at the second rib 58, and a rib is formed between the downstream end of the third sub-gas channel 68 and the first main gas channel 18A (or the first main gas channel 18C).

In a case where the reactant gas supplied to the fuel cell 100 is low in humidity, the humidity on the downstream side of the gas channel becomes relatively higher than the humidity on the upstream side of the gas channel by the generation of the produced water and the gas consumption. Therefore, the reason why the cell performance deteriorates by the low humidity is the low relative humidity of the reactant gas on the upstream side. In the fuel cell separator 10B according to Embodiment 7 and the fuel cell 100 including the fuel cell separator 10B, the third sub-gas channel 68 having the same operational advantages as the second sub-gas channel 38 is formed on the upstream side of the oxidizing gas channel 8. With this, the relative humidity on the upstream side of the oxidizing gas channel 8, the relative humidity at a portion of the cathode 4B which portion faces the upstream side of the oxidizing gas channel 8, and the relative humidity in the vicinity of the portion of the cathode 4B can be further increased. Therefore, in the fuel cell separator 10B according to Embodiment 7 and the fuel cell 100 including the fuel cell separator 10B, the cell performance can be further improved.

Embodiment 8

Figure 10:
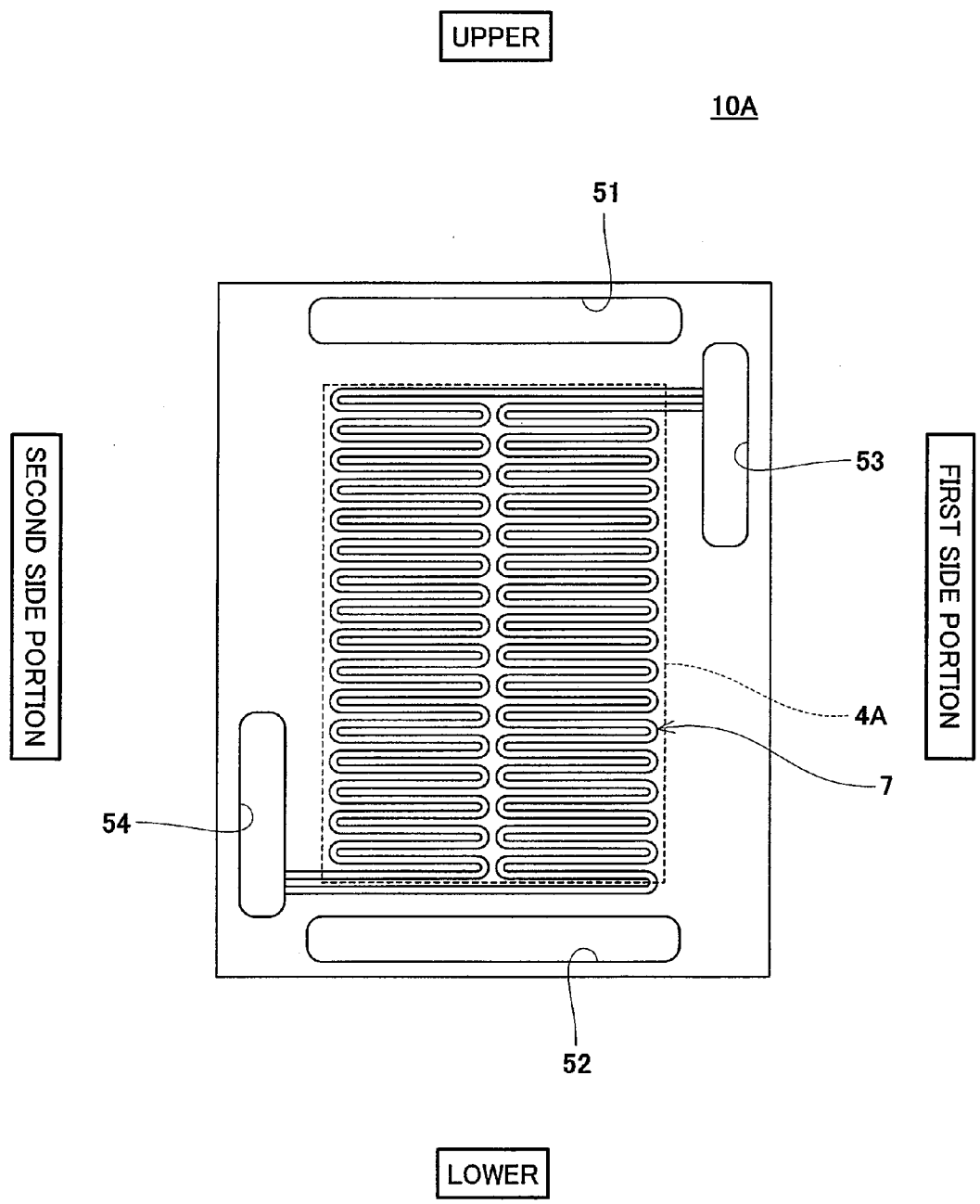
FIG. 10 is a schematic diagram showing a schematic configuration of a second separator of the fuel cell according to Embodiment 8 of the present disclosure.

FIG. 10 is a schematic diagram showing a schematic configuration of the second separator of the fuel cell according to Embodiment 8 of the present disclosure.

The fuel cell 100 according to Embodiment 8 of the present disclosure is the same in basic configuration as the fuel cell 100 according to Embodiment 1. However, as shown in FIG. 10, Embodiment 8 is different from Embodiment 1 in that a part (herein, a horizontally extending portion) of the fuel gas channel (second main gas channel) 7 of the anode separator (second separator) overlaps not only the second sub-gas channel 38 of the oxidizing gas channel 8 but also the horizontally extending portion of the first main gas channel 18 when viewed from the thickness direction of the anode separator 10A (cathode separator 10B).

The fuel cell 100 according to Embodiment 8 configured as above has the same operational advantages as the fuel cell 100 according to Embodiment 1. Moreover, in the fuel cell 100 according to Embodiment 8, by increasing the number of turns (number of corners) of the fuel gas channel 7, the pressure loss can be increased, and the fuel gas can be more uniformly supplied to the anode 4A.

In the above embodiments, the cathode separator 10B (oxidizing gas channel 8) and the anode separator 10A (fuel gas channel 7) are configured differently. However, the present embodiments are not limited to this. As with the oxidizing gas channel 8, the fuel gas channel 7 may be configured to include a main gas channel and first to third sub-gas channels. In this case, the fuel gas supplying manifold hole constitutes the first gas manifold hole, and the fuel gas discharging manifold hole constitutes the second gas manifold hole.

The foregoing has explained the embodiments of the present disclosure in detail. However, the present disclosure is not limited to the above embodiments.

Next, the following will explain results obtained by verifying through simulation analysis the effects of the fuel cell separator 10B according to the present disclosure and the fuel cell (herein, single cell) 100 including the fuel cell separator 10B. To simplify evaluations, only an electrode surface is used as an analysis object.

EXAMPLES

Test Example 1

Figure 11:
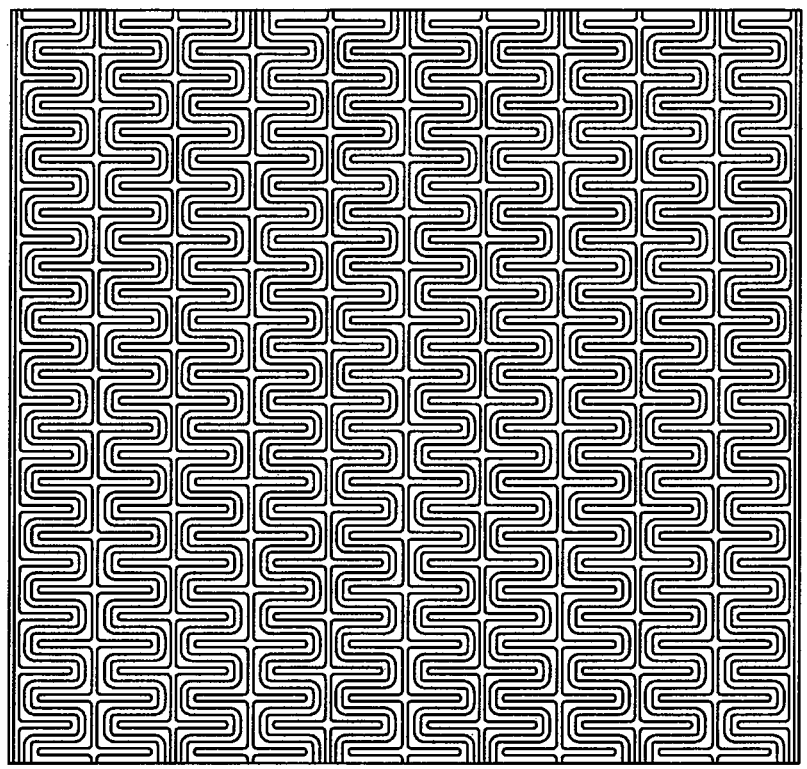
FIG. 11 is a schematic diagram showing a schematic configuration of a gas channel used in Test Example 1.
Figure 12:
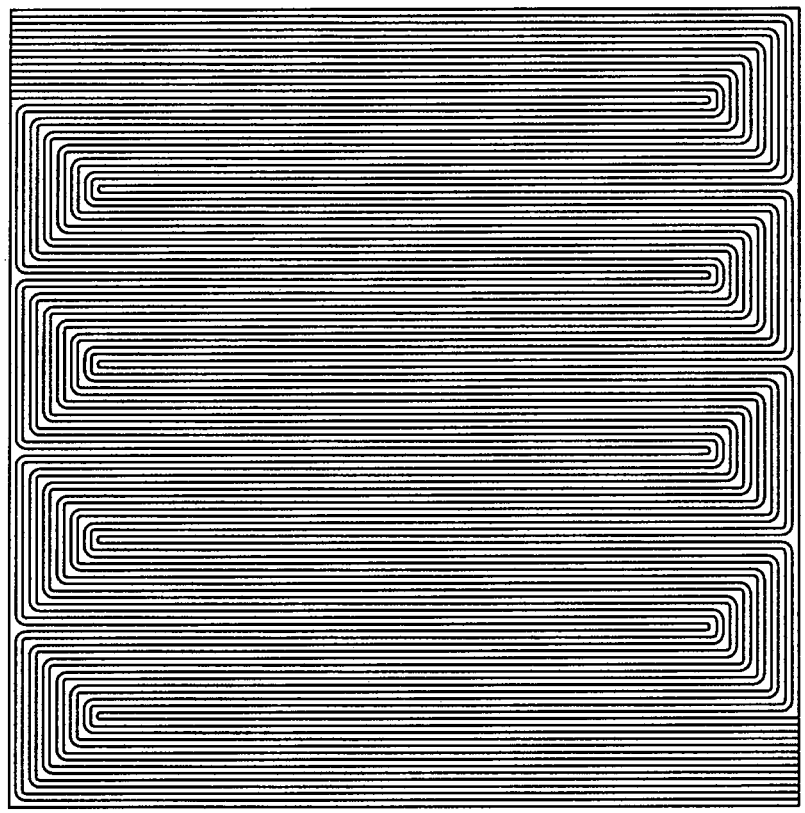
FIG. 12 is a schematic diagram showing a schematic configuration of the gas channel used in Test Example 1.
Figure 13:
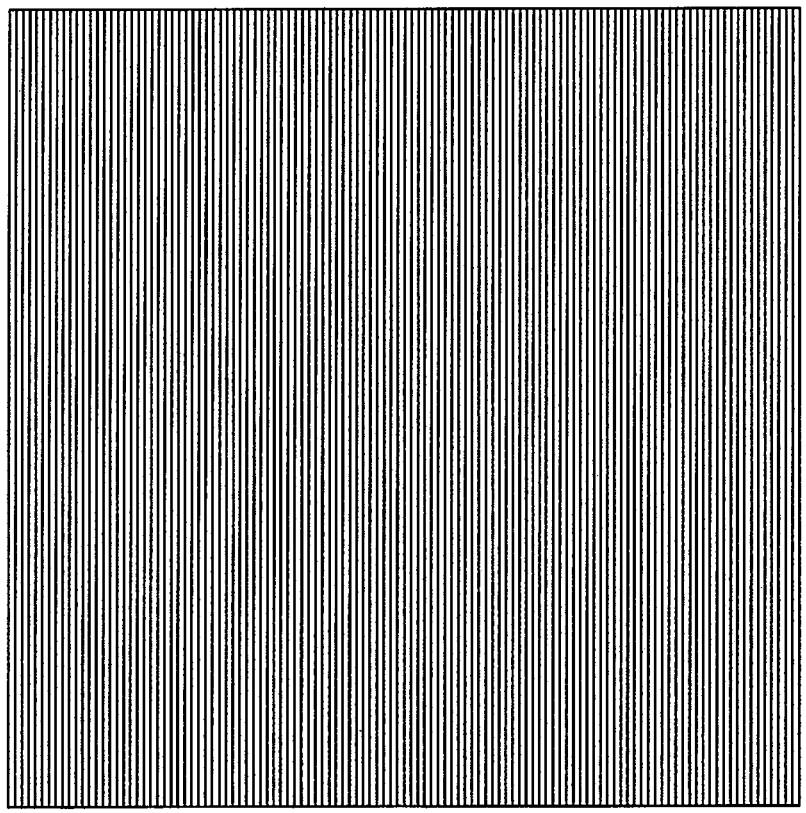
FIG. 13 is a schematic diagram showing a schematic configuration of the gas channel used in Test Example 1.

FIGS. 11 to 13 are schematic diagrams each showing a schematic configuration of the gas channel used in Test Example 1.

A gas channel (corresponding to Embodiment 3 of the present disclosure) shown in FIG. 11 was used as the oxidizing gas channel 8 of Example 1, a gas channel (serpentine) shown in FIG. 12 was used as the oxidizing gas channel 8 of Comparative Example 1, and a gas channel (straight) shown in FIG. 13 was used as the oxidizing gas channel 8 of Comparative Example 2. Moreover, a gas channel shown in FIG. 13 was used as the fuel gas channel 7 of each of Example 1 and Comparative Examples 1 and 2.

In the analysis, FLUENT and PEM Module produced by ANSYS Japan K.K. were used. As conditions for the electric power generation, a current density was 0.24 A/cm$^2$, a fuel utilization ratio was 75%, an oxygen utilization ratio was 55%, the fuel gas contained 75% of hydrogen, a mixture gas contained 25% of carbon dioxide, the oxidizing gas was air, the dew point of each of the fuel gas and the oxidizing gas was 65° C., and the temperature of the cell was 90° C.

As a result, a cell voltage was 713.3 mV in Example 1, 708.1 mV in Comparative Example 1, and 705.9 mV in Comparative Example 2. Moreover, a proton conductivity which varies depending on the moisture content of the polymer electrolyte membrane 1 was 1.51 S/m in Example 1, 1.41 S/m in Comparative Example 1, and 1.33 S/m in Comparative Example 2.

Test Example 2

Figure 14:
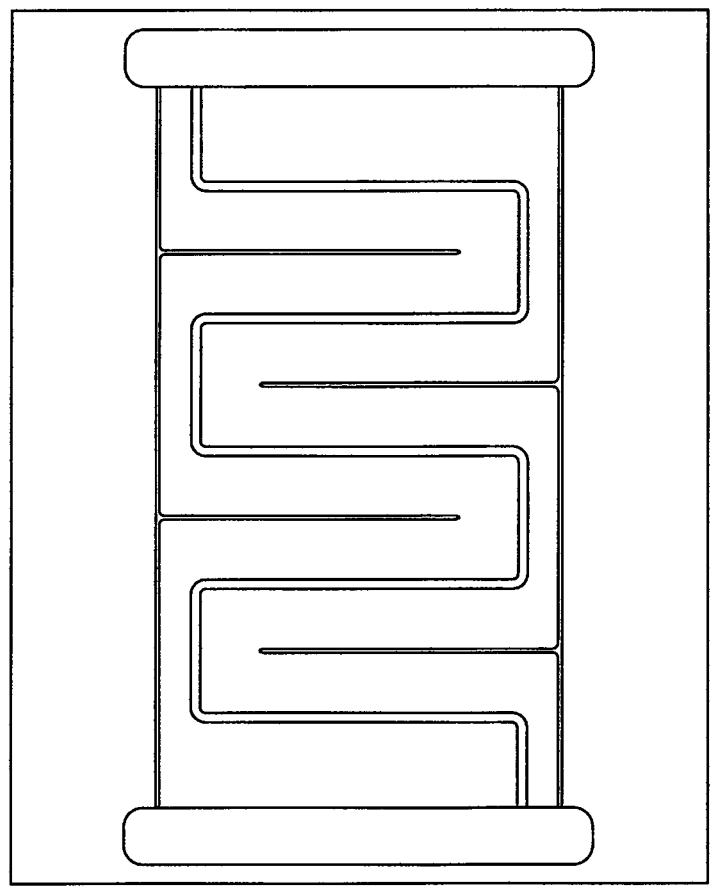
FIG. 14 is a schematic diagram showing a schematic configuration of the gas channel used in Test Example 2.
Figure 15:
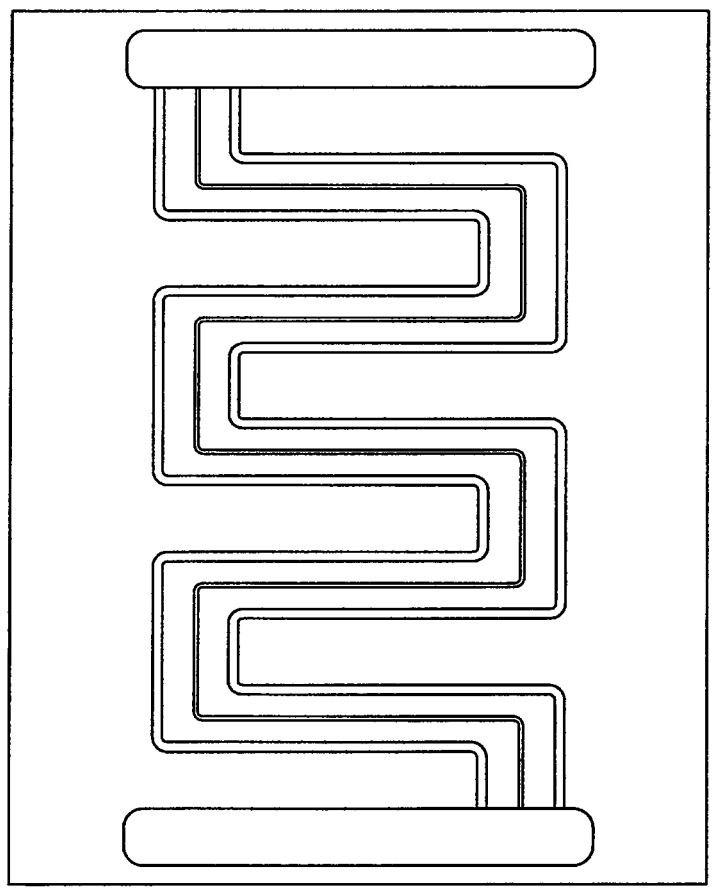
FIG. 15 is a schematic diagram showing a schematic configuration of the gas channel used in Test Example 2.
Figure 16:
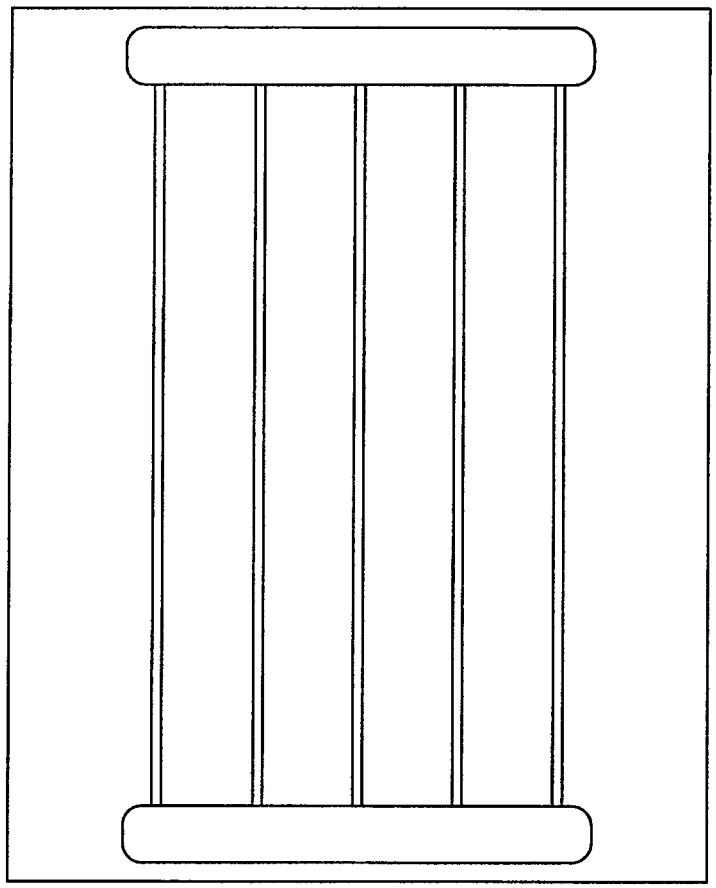
FIG. 16 is a schematic diagram showing a schematic configuration of the gas channel used in Test Example 2.

FIGS. 14 to 16 are schematic diagrams each showing a schematic configuration of the gas channel used in Test Example 2.

A gas channel (corresponding to Embodiment 3 of the present disclosure) shown in FIG. 14 was used as the oxidizing gas channel 8 of Example 2, and a gas channel (corresponding to the oxidizing gas channel and the fine groove in the fuel cell disclosed in Document 1) shown in FIG. 15 was used as the oxidizing gas channel 8 of Comparative Example 3. Moreover, a gas channel shown in FIG. 16 was used as the fuel gas channel 7 of each of Example 2 and Comparative Example 3. The analysis was carried out in the same manner as in Test Example 1 except that the current density was set to 0.16 A/cm$^2$.

As a result, the cell voltage was 698.1 mV in Example 2 and 698.9 mV in Comparative Example 3. Moreover, the proton conductivity which varies depending on the moisture content of the polymer electrolyte membrane 1 was 1.51 S/m in Example 2 and 1.41 S/m in Comparative Example 3.

Reference Example

Figure 17:
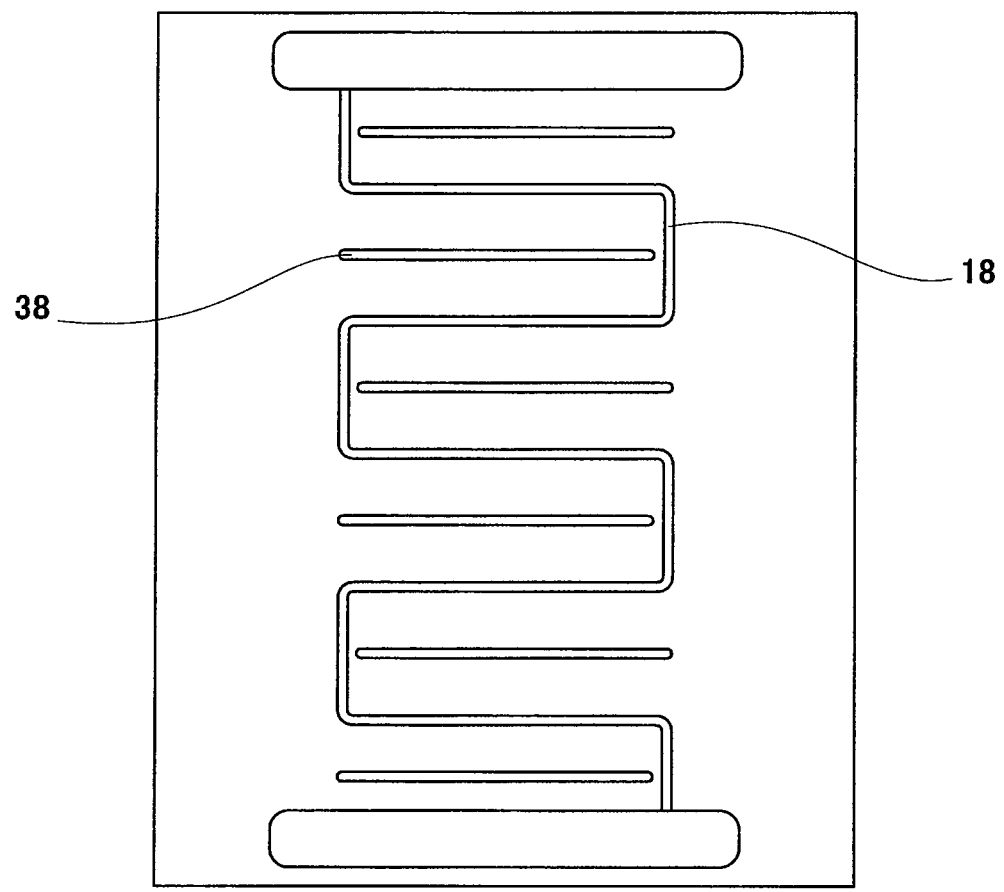
FIG. 17 is a schematic diagram showing a schematic configuration of the gas channel used in Reference Example.
Figure 18:
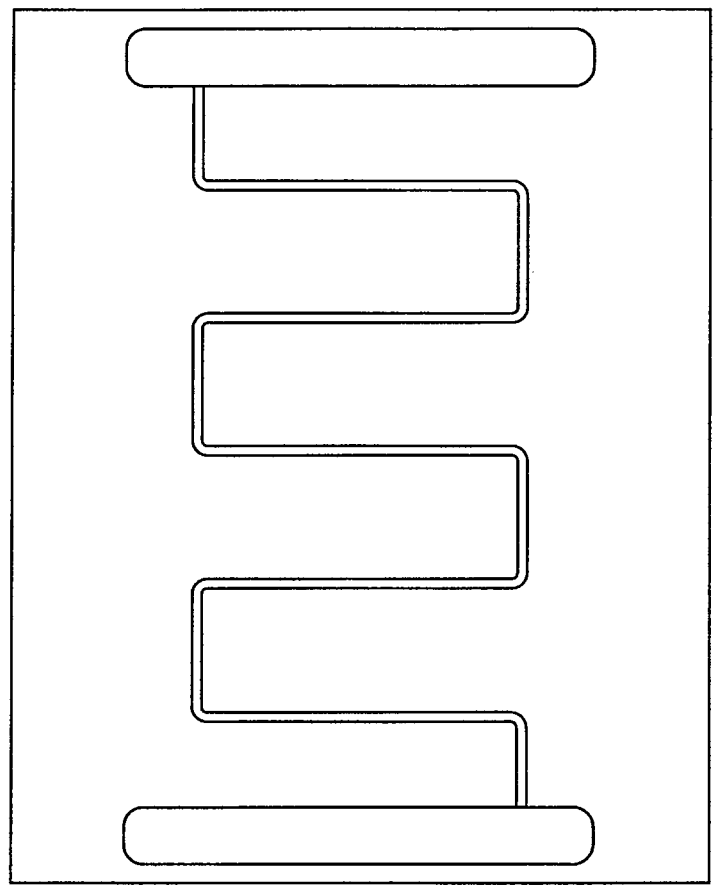
FIG. 18 is a schematic diagram showing a schematic configuration of the gas channel used in Reference Example.

FIGS. 17 and 18 are schematic diagrams each showing a schematic configuration of the gas channel used in Reference Example.

A gas channel shown in FIG. 17 was used as the oxidizing gas channel 8 of Reference Example 1. To be specific, a channel constituted by the first main gas channel 18 and the second sub-gas channel 38 formed along the first main gas channel 18 was used as the oxidizing gas channel 8 of Reference Example 1. A gas channel (serpentine channel used in a common fuel cell) shown in FIG. 18 was used as the oxidizing gas channel 8 of Reference Example 2. Moreover, a gas channel shown in FIG. 16 was used as the fuel gas channel 7 of each of Reference Examples 1 and 2. The analysis was carried out in the same manner as in Test Example 1.

As a result, the cell voltage was 706.3 mV in Reference Example 1 and 707.0 mV in Reference Example 2. Moreover, the proton conductivity which varies depending on the moisture content of the polymer electrolyte membrane 1 was 1.53 S/m in Reference Example 1 and 1.54 S/m in Reference Example 2.

According to the above results, in the fuel cell separator 10B according to the present disclosure and the fuel cell 100 including the fuel cell separator 10B, the proton conductivity which influences the cell performance by the increase in the moisture content of the polymer electrolyte membrane 1 was confirmed to be improved. Moreover, the results of Reference Examples 1 and 2 have indicated that the proton conductivity could not be improved only by forming the second sub-gas channel 38 configured to cause the produced water to remain. To be specific, the results of Reference Examples 1 and 2 have indicated that even if the water reservoir groove which was not communicated with the reactant gas manifold hole was formed as with the fuel cell disclosed in Document 2, the reactant gas was not adequately supplied to the water reservoir groove, so that the water was not adequately generated, and the proton conductivity could not be improved.

Therefore, the foregoing has indicated that by forming on the fuel cell separator 10B the first main gas channel 18 configured to mainly supply the reactant gas to the entire region of the electrode, the first sub-gas channel 28 configured to supply the reactant gas to the second sub-gas channel 38, and the second sub-gas channel 38 configured to branch from the first sub-gas channel 28 and cause the water generated by the electrochemical reaction to remain therein as in the fuel cell separator 11 according to the present disclosure and the fuel cell 100 including the fuel cell separator 11, the high-humidity high-gas-concentration region was formed in the fuel cell 100, so that the cell performance could be improved.

From the foregoing explanation, many modifications and other embodiments of the present disclosure are obvious to one skilled in the art. Therefore, the foregoing explanation should be interpreted only as an example, and is provided for the purpose of teaching the best mode for carrying out the present disclosure to one skilled in the art. The structures and/or functional details may be substantially modified within the spirit of the present disclosure. In addition, various inventions may be made by suitable combinations of a plurality of components disclosed in the above embodiments.

In the fuel cell separator of the present disclosure and the fuel cell including the fuel cell separator, a high-humidity region is formed in the cell under such an operating condition that the reactant gas to be supplied is low in humidity, and the reactant gas is supplied to the region. Therefore, the fuel cell can efficiently generate electric power. On this account, the fuel cell separator of the present disclosure and the fuel cell including the fuel cell separator are useful in the technical field of the fuel cell.

As this disclosure may be embodied in several forms without departing from the spirit of essential characteristics thereof, the present embodiments are therefore illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. A fuel cell separator comprising:
   a plate;
   a first gas manifold hole for supplying a reactant gas, formed to penetrate said plate in a thickness direction thereof;
   a second gas manifold hole for discharging the reactant gas, formed to penetrate said plate in a thickness direction thereof;
   one or more groove-like first main gas channels formed on a surface of said plate to have one end connected to said first gas manifold hole and the other end connected to said second gas manifold hole, wherein the first main gas channel is formed to have a serpentine shape;
   a groove-like first sub-gas channel formed on the surface of said plate to have one end connected to at least one of said first gas manifold hole and said second gas manifold hole; and
   a groove-like second sub-gas channel formed on the surface of said plate to have one end branching from said first sub-gas channel and the other end being closed,
   wherein the one or more groove-like first main gas channels are separated from the groove-like first and second sub-gas channels by a rib.

2. The fuel cell separator according to claim 1, wherein the second sub-gas channel is provided at a first rib portion formed to be sandwiched by the first main gas channel.

3. The fuel cell separator according to claim 1, wherein a cross-sectional area of the first sub-gas channel is smaller than a cross-sectional area of the first main gas channel.

4. The fuel cell separator according to claim 1, wherein the first sub-gas channel has one end connected to the first gas manifold hole and the other end connected to the second gas manifold hole.

5. The fuel cell separator according to claim 1, wherein the first sub-gas channel has one end connected to the first gas manifold hole and the other end being closed.

6. The fuel cell separator according to claim 1, wherein the first sub-gas channel has one end being closed and the other end connected to the second gas manifold hole.

7. The fuel cell separator according to claim 1, wherein:
a plurality of the first main gas channels are formed to extend in parallel with one another; and
a groove-like third sub-gas channel is provided at a second rib portion formed between the plurality of the first main gas channels.

8. The fuel cell separator according to claim 7, wherein the third sub-gas channel has one end connected to the first gas manifold hole or the second gas manifold hole and the other end being closed.

9. The fuel cell separator according to claim 1, wherein a plurality of second sub-gas channels are provided and the second sub-gas channel is one of the plurality of second sub-gas channels.

10. The fuel cell separator according to claim 1, wherein the one or more groove-like first main gas channels have no branch.

11. A fuel cell comprising:
a first separator including:
a plate;
a first gas manifold hole for supplying a reactant gas, formed to penetrate said plate in a thickness direction thereof;
a second gas manifold hole for discharging the reactant gas, formed to penetrate said plate in a thickness direction thereof;
one or more groove-like first main gas channels formed on a surface of said plate to have one end connected to said first gas manifold hole and the other end connected to said second gas manifold hole, wherein the first main gas channel is formed to have a serpentine shape;
a groove-like first sub-gas channel formed on the surface of said plate to have one end connected to at least one of said first gas manifold hole and said second gas manifold hole; and
a groove-like second sub-gas channel formed on the surface of said plate to have one end branching from said first sub-gas channel and the other end being closed;
a second separator including a plate; and
a membrane-electrode assembly provided between the first separator and the second separator,
wherein the one or more groove-like first main gas channels are separated from the groove-like first and second sub-gas channels by a rib.

12. The fuel cell according to claim 11, wherein:
a groove-like second main gas channel is formed on one main surface of the second separator; and
at least a part of the second main gas channel overlaps the second sub-gas channel of the first separator when viewed from the thickness direction of the first separator.

13. The fuel cell according to claim 11, wherein the one or more groove-like first main gas channels have no branch.

* * * * *